US012544673B2

(12) United States Patent
Vogel et al.

(10) Patent No.: US 12,544,673 B2
(45) Date of Patent: Feb. 10, 2026

(54) SYSTEM AND METHOD FOR EXECUTING AND MANIPULATING A STORYLINE

(71) Applicant: INSOLENT GAMES INC., Carson City, NV (US)

(72) Inventors: Claude Vogel, Carson City, NV (US); Francisco Demartino, Carson City, NV (US); James Haymaker, Carson City, NV (US); Pablo E. Zanitti, Carson City, NV (US)

(73) Assignee: Insolent Games Inc., Carson City, NV (US)

( * ) Notice: Subject to any disclaimer, the term of this patent is extended or adjusted under 35 U.S.C. 154(b) by 346 days.

(21) Appl. No.: 18/083,854

(22) Filed: Dec. 19, 2022

(65) Prior Publication Data

US 2023/0135871 A1 May 4, 2023

Related U.S. Application Data

(63) Continuation of application No. PCT/US2021/038506, filed on Jun. 22, 2021.

(60) Provisional application No. 63/043,701, filed on Jun. 24, 2020.

(51) Int. Cl.
| *A63F 13/00* | (2014.01) |
| *A63F 13/42* | (2014.01) |
| *A63F 13/63* | (2014.01) |
| *A63F 13/69* | (2014.01) |
| *G06F 40/30* | (2020.01) |
| *G06N 5/02* | (2023.01) |

(52) U.S. Cl.
CPC .............. *A63F 13/63* (2014.09); *A63F 13/42* (2014.09); *A63F 13/69* (2014.09); *G06F 40/30* (2020.01); *G06N 5/027* (2013.01)

(58) Field of Classification Search
None
See application file for complete search history.

(56) References Cited

U.S. PATENT DOCUMENTS

| 8,271,962 | B2 * | 9/2012 | Muller | G06F 40/166 |
| | | | | 717/169 |
| 9,003,287 | B2 * | 4/2015 | Goldenberg | G11B 27/34 |
| | | | | 715/848 |
| 10,279,259 | B2 * | 5/2019 | Jiang | A63F 13/52 |
| 10,346,001 | B2 * | 7/2019 | Greenberg | G06F 3/0481 |
| 10,589,177 | B2 * | 3/2020 | Silver | A63F 13/52 |
| 11,205,458 | B1 * | 12/2021 | Torres | H04N 5/2222 |
| 11,463,652 | B2 * | 10/2022 | Yu | H04N 21/23418 |
| 11,673,053 | B2 * | 6/2023 | Bererton | A63F 13/71 |
| | | | | 463/43 |
| 2008/0307304 | A1 * | 12/2008 | Feiler | G11B 27/28 |
| | | | | 715/700 |
| 2009/0253517 | A1 | 10/2009 | Bererton et al. | |
| 2015/0165310 | A1 | 6/2015 | Rebh et al. | |
| 2018/0221761 | A1 * | 8/2018 | Knutsson | A63F 13/335 |

* cited by examiner

*Primary Examiner* — Sunit Pandya
(74) *Attorney, Agent, or Firm* — Manatt, Phelps & Phillips, LLP

(57) ABSTRACT

A system and method that generates a screenplay from a text of a book for a game play that incorporates artificial intelligence to allow the player to modify/change the story and the system will adjust the story and game play based on the player's modification.

30 Claims, 49 Drawing Sheets

| play_id | scene | scene_id | play_script_id | sentence | MLS | MBP | ME | CS |
|---|---|---|---|---|---|---|---|---|
| | voice | | sticker1 face | sticker2 | sticker2 face | background | time of day | agent |
| | action | patient | cut_scene | lead | cast1 | animation1 | spot1 | facing1 |
| | | cast2 | animation2 | spot2 | facing2 | cast3 | animation3 | spot3 | facing3 |
| | | cast4 | animation4 | spot4 | facing4 | cast5 | animation5 | spot5 | facing5 |
| | | cast6 | animation6 | spot6 | facing61 | new | 1 | 1 | There was a man | who had fine houses, both in town and country, Hace algún tiempo, había un hombre que tenía fabulosas mansiones en la
ciudad y en el campo, Era uma vez um homem que possuía casas muito bonitas na cidade e no campo, There once was a
man who had many fine houses, both in the city and the country, a great deal of silver and gold, En otro tiempo vivía un hombre
que tenía hermosas casas en la ciudad y en el campo,

| | | Castle | mid day | bluebeard | VO | bluebeard | debonair | bluebeard | bluebeard |
| | | boast | castle | castle | boast | | | | | play interpreted and defined as a JSON stored in Mongo DB and Redis:

```
{
 "_id" : ObjectId("5eb18afcf3dceb47ed782760"),
 "corpus" : "perrault",
 "title_id" : "BlueBeard",
 "language" : "en",
 "style" : "classic",
 "user_id" : "perrault",
 "version" : NumberInt(1),
 "sentence" : "There was a man who had fine houses, both in town and country,",
 "voice" : "VO",
 "scene_id" : NumberInt(1),
 "play_script_id" : NumberInt(1),
 "play_id" : NumberInt(1),
 "settings" : {
  "time_of_day" : "mid day",
  "background" : "Castle" },
```

FIGURE 7A

```
"cut_scene" : "",
"fact" : [
    {
        "agent" : "bluebeard",
        "agent_gender" : "male",
        "action" : "boast",
        "surface" : "boast",
        "deep" : "BOAST",
        "trans" : "etrans",
        "semio" : "adverse",
        "patient" : "",
        "patient_gender" : "na",
        "recipient" : "na",
        "object" : "na",
        "pattern" : "TRANS_XO",
        "value" : "debonair",
        "face" : "amusement_1_debonair",
        "res" : "ACKNOWLEDGE",
        "res_key" : "notice"
    },
"stickers" : [
    {
        "cast" : "bluebeard",
        "name" : "bluebeard_sticker",
        "spot" : "left",
        "slot" : "a",
        "position" : "front",
        "orientation" : "right",
        "face" : "amusement_1_debonair",
        "dialogue" : null
    }
],
```

FIGURE 7B

```
"lead" : "bluebeard",
"cast_on_stage" : [
    {
        "stock_cast" : "5de59a10118le9084d8b08b1",
        "name" : "bluebeard",
        "display" : "Blue Beard",
        "gender" : "male",
        "role" : "supporting",
        "lock" : NumberInt(1)
    }
],
"cast_playbooks" : {
    "bluebeard" : {
        "goal" : {
            "name" : "boast",
            "type" : "goal"
        },
        "stack" : [
            "action" : {
                "name" : "boast"
            }
        ]
    }
},
```

FIGURE 7C

```
"cast_scripts" : [
    {
        "name" : "bluebeard",
        "location" : {
            "background" : "Castle",
            "spot" : "castle",
            "location" : "center",
            "coordinates" : {
                "x" : "-3.51",
                "y" : "0.5",
                "z" : "18.65"
            }
        },
        "facing" : {
            "name" : "castle",
            "coordinates" : {
                "x" : "-3.51",
                "y" : "0.5",
                "z" : "18.65"
            }
        },
        "animation" : {
            "name" : "boast_1",
            "duration" : NumberInt(4)
        },
        "dialogue" : null,
        "duration" : NumberInt(4)
    },
    "voice_over" : {
        "text" : "There was a man who had fine houses, both in town and country," ,
        "duration" : NumberInt(5)
    },
```

FIGURE 7D

```
{ "cast_on_stage": [
    { "display": "Blue Beard", "gender": "male", "lock": 1, "name": "bluebeard" ,
      "role": "supporting", "stock_cast": "5de59a101181e9084d8b08b1" },
    { "display": "wife", "gender": "female", "lock": 0, "name": "wife",
      "role": "supporting", "stock_cast": "5c2d02719bafa8013a1f484c" } ],
  "cast_scripts": [
    { "animation": { "duration": 5, "name": "instruct_1" },
      "dialogue": null, "duration": 5,
      "facing": { "coordinates": { "x": "-2.98", "y": "0.5", "z": "12.9" }, "name": "wife" },
      "location": {
        "background": "Castle_Floorplan",
        "coordinates": { "x": "5.15", "y": "0.5", "z": "12.53" },
        "location": "center", "spot": "lounge" },
      "name": "bluebeard",
      "shot": null, "start": 38 },
    { "animation": { "duration": 5, "name": "idle_1" },
      "dialogue": null,
      "duration": 5,
      "facing": { "coordinates": { "x": "5.15", "y": "0.5", "z": "12.53" }, "name": "bluebeard" },
      "location": {
        "background": "Castle_Floorplan",
        "coordinates": { "x": "-2.98", "y": "0.5", "z": "12.9" },
        "location": "lounge1", "spot": "lounge" },
      "name": "wife",
      "shot": null, "start": 38 } ],
  "duration": 5,
  "lead": "bluebeard",
  "play_id": 21, "play_script_id": 7, "scene_id": 6,
  "start": 38,
  "stickers": [
    { "cast": "bluebeard",
      "dialogue": {
        "duration": 6,
        "text": "Here are the keys of the two great wardrobes, wherein I have my best furniture." },
      "face": "serious_2_serious",
      "name": "bluebeard_sticker",
      "orientation": "right", "position": "front", "slot": "a", "spot": "left" },
    { "cast": "wife",
      "dialogue": null,
      "face": "anxiety_1_thinking",
      "name": "wife_sticker",
      "orientation": "left", "position": "front", "slot": "c", "spot": "right" } ],
  "transition": null,
  "voice_over": null },
```

FIGURE 9

```
{
  "model": "RETALIATE",
  "simplified": "CONFRONT",
  "pattern": "TRANS_XY",
  "persona": "adverse",
  "polarity": "negative",
  "action": "retaliate",
  "affect": {
    "vector": "indignant",
    "intensity": "3",
    "value": "angry"
  },
  "surface": {
    "concept": "retaliation",
    "verb": "retaliate"
  },
  "resolutions": {
    "assertive": {
      "resolution": "CONFRONT",
      "affect": {
        "vector": "indignation",
        "intensity": "3",
        "value": "angry"
      }
    },
    "passive": {
      "resolution": "RECOIL",
      "affect": {
        "vector": "anxiety",
        "intensity": "2",
        "value": "anxious"
      }
    },
    "adverse": {
      "resolution": "CONSPIRE",
      "affect": {
        "vector": "seriousness",
        "intensity": "2",
        "value": "serious"
      }
    },
    "supportive": {
      "resolution": "CONFRONT",
      "affect": {
        "vector": "indignation",
        "intensity": "3",
        "value": "angry"
      }
    }
  }
}
```

FIGURE 11

```
{
  "model": "AGREE",
  "simplified": "ACCEPT",
  "pattern": "TRANS_XO",
  "persona": "assertive",
  "polarity": "positive",
  "action": "agree",
  "affect": {
    "vector": "like",
    "intensity": "1",
    "value": "notice"
  },
  "surface": {
    "concept": "agreement",
    "verb": "agree"
  },
  "resolutions": {
    "assertive": {
      "resolution": "THANK",
      "affect": {
        "vector": "like",
        "intensity": "2",
        "value": "like"
      },
    },
    "passive": {
      "resolution": "COMPLAIN",
      "affect": {
        "vector": "indignant",
        "intensity": "2",
        "value": "indignant"
      },
    },
    "adverse": {
      "resolution": "DECEIT",
      "affect": {
        "vector": "serious",
        "intensity": "2",
        "value": "serious"
      },
    },
    "supportive": {
      "resolution": "PRAISE",
      "affect": {
        "vector": "like",
        "intensity": "4",
        "value": "adore"
      },
    }
  }
}
```

FIGURE 12

I. ONE OF THE MEMBERS OF A FAMILY ABSENTS HIMSELF FROM HOME. (Definition: absentation. Designation: β)

II. AN INTERDICTION IS ADDRESSED TO THE HERO. (Definition: interdiction. Designation: γ)

III. THE INTERDICTION IS VIOLATED (Definition: violation. Designation: δ.)

IV. THE VILLAIN MAKES AN ATTEMPT AT RECONNAISSANCE. (Definition: reconnaissance. Designation: ε.)

...

XXX. THE VILLAIN IS PUNISHED. (Definition: punishment. Designation. U.)

XXXI. THE HERO IS MARRIED AND ASCENDS THE THRONE. (Definition: wedding. Designation: W.)

FIGURE 13

| narrative function | narrative closure | verbatim |
|---|---|---|
| establishing_description | | Once there was a gentleman who married, for his second wife, |
| establishing_description | | the proudest and most haughty woman that was ever seen. |
| establishing_description | | She had, by a former husband, two daughters of her own humour |
| establishing_description | | and they were indeed exactly like her in all things. |
| establishing_description | | He had likewise, by another wife, a young daughter, |
| establishing_description | | but of unparalleled goodness and sweetness of temper, |
| establishing_description | | which she took from her mother, |
| establishing_description | | who was the best creature in the world. |
| establishing_description | | No sooner were the ceremonies of the wedding over, |
| initial situation | Satisfaction | but the stepmother began to shew herself in her colours. |
| initial situation | Satisfaction | She could not bear the good qualities of this pretty girl; |
| initial situation | Satisfaction | and the less, because they made her own daughters appear the more odious. |
| abuse | Villainy | She employed her in the meanest work of the house; |
| abuse | Villainy | she scoured the dishes, tables, &c. and rubbed Madam's chamber, and those of Misses, her daughters; |
| abuse | Villainy | she lay up in a sorry garret, upon a wretched straw-bed, |

FIGURE 14

```
{
  "type" : "script",
  "name" : "bait_kill",
  "display" : "bait kill",
  "logline" : "{cast:ego} decides to bait
{cast:alter} into a trap, and kill {poss:alter}",
  "device" : "plot",
  "genre" : [
    "horror",
    "crime",
    "romance"
  ],
  "res" : [
    "KILL"
  ],
  "trope" : [
    "decoy_killer"
  ],
  "ego" : {
    "role" : "agent",
    "gender" : "na",
    "age" : "adult",
    "ms" : "na",
    "persona" : [
      {
        "name" : "adverse",
        "status" : NumberInt(2)
      }
    ]
  },
  "alter" : {
    "role" : "patient",
    "gender" : "na",
    "age" : "adult",
    "ms" : "na",
    "persona" : [
      {
        "name" : "na",
        "status" : NumberInt(1)
      }
    ]
  },
  "steps" : [
    {
      "name" : "wed",
      "type" : "script"
    },
    {
      "name" : "decoy",
      "type" : "script"
    },
    {
      "name" : "punish",
      "type" : "action"
    }
  ]
}
```

| Fact | | Social | | Recent Dialog | |
|---|---|---|---|---|---|
| Trans | Semio | A - R Social S | X - R Social S: Assumed Intent | | Dialog Examples |
| any | pos | pos | pos | | I'm glad you said that |
| any | neg | pos | pos | | It's bad news, but I'm glad you told me about it. |
| any | pos | neg | neg | | This must make you feel very happy! |
| any | neg | neg | neg | | This bad news must make you feel very happy! |
| | | | C | | |

FIGURE 17

| Fact | | Social | | Recent Dialog | |
|---|---|---|---|---|---|
| Trans | Semio | A - R Social S | X - R Social Scale (X = A) | | Personal Outcome |
| any | pos | pos | pos | | pos |
| any | neg | pos | pos | | neg |
| any | pos | neg | neg | | neg |
| any | neg | neg | neg | | pos |
| | | | | | B * C |

| | Dialog Examples |
|---|---|
| | I feel really good about this |
| | I feel sorry about this |
| | Well, I have a hard time feeling good about this |
| | Sounds bad, but there is a silver lining |

| Fact | | Social | | Recent Dialog | Dialog Examples |
|---|---|---|---|---|---|
| Trans | Semio | A - R Social S | X - R Social Scale (X = A) | Belief | |
| any | pos | pos | | pos | Sounds like a no brainer |
| any | neg | pos | | pos | This was waiting to happen. Thanks for sharing |
| any | pos | neg | | neg | Sounds too good to be true |
| any | neg | neg | | neg | What an awful thing to say. Not sure I believe this. |
|  |  |  |  | c |  |

```
% utils
member(?x, []) -> fail;
member(?x, [?x, ?l]) -> ;
member(?x, [?y, ?l]) -> member(?x, ?l);

map_friends(?x, []) -> ;
map_friends(?x, [?y, ?l]) -> exec_has_friends(?y, ?l2) befriend(?x, ?l2);

befriend(?x, []) -> ;
befriend(?x, [?y, ?l]) -> exec_not(<"enemy", ?x, ?y>) exec_add_friend(?x, ?y);

%%%%% social
%   step friend rules: a friend/foe of my friend/foe is a friend/foe, and it stops there
%   check if ?y is my friend
friend(?x, ?y) -> exec_has_friends(?x, ?l) member(?y, l);
%   friends of my friends become my friends if they are not already my enemies
friends_of_my_friends(?x) -> exec_has_friends(?x, ?l) map_friends(?x, ?l);
%   friends of my enemies are my enemies enemy(?x, ?y) -> is_enemy(?x, ?y);
enemy(?x, ?y) -> has_friends(?y, ?l)
has_friends(?y, ?l) add_enemies(l);
%   enemies of my friends are my enemies
friend(?x, ?y) -> is_friend(?x, ?y);
friend(?x, ?y) -> has_friends(?x, ?l) member(?y, l);
%   enemies of my enemies are my friends
friend(?x, ?y) -> is_friend(?x, ?y);
friend(?x, ?y) -> has_friends(?x, ?l) member(?y, l);
```

FIGURE 20

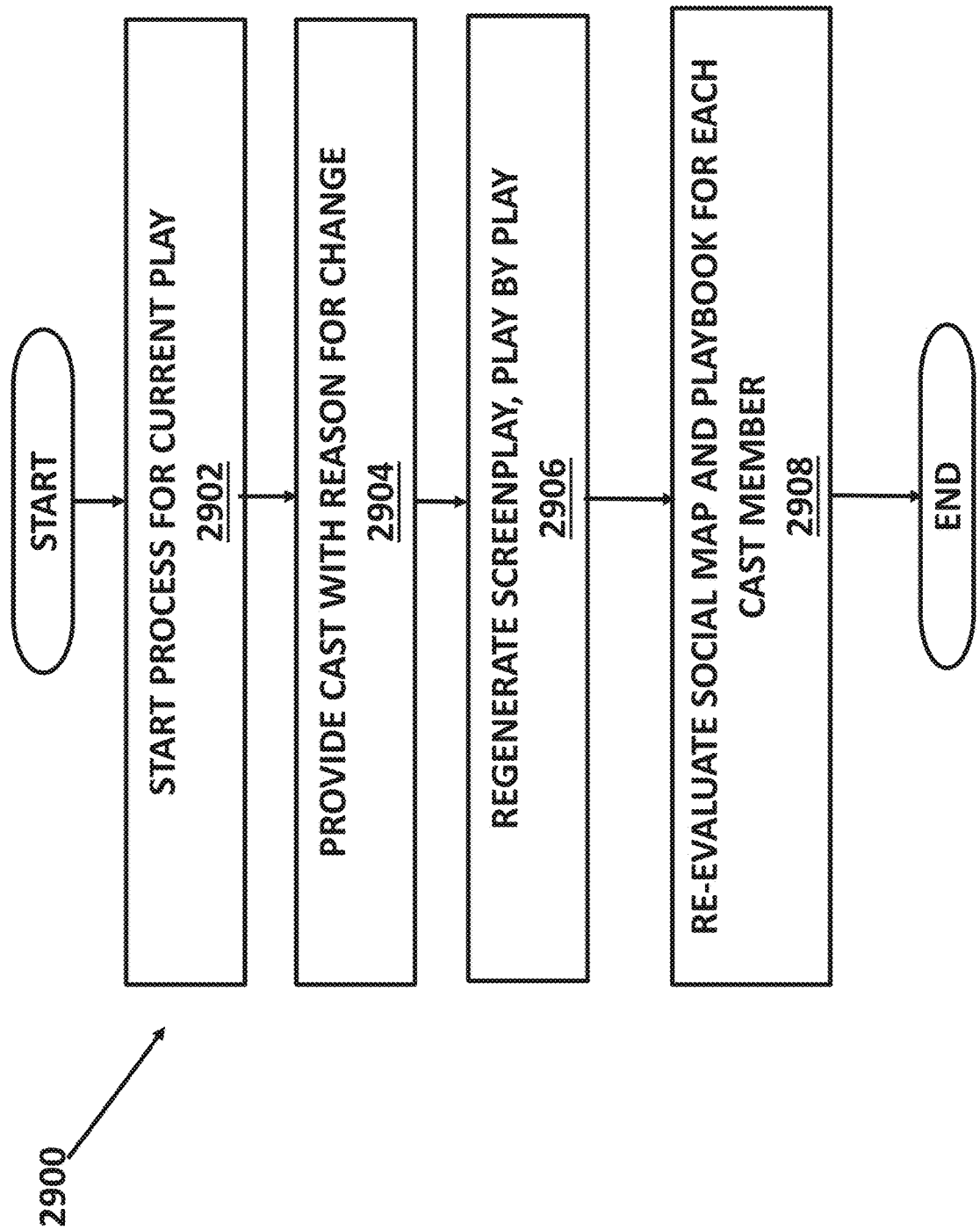

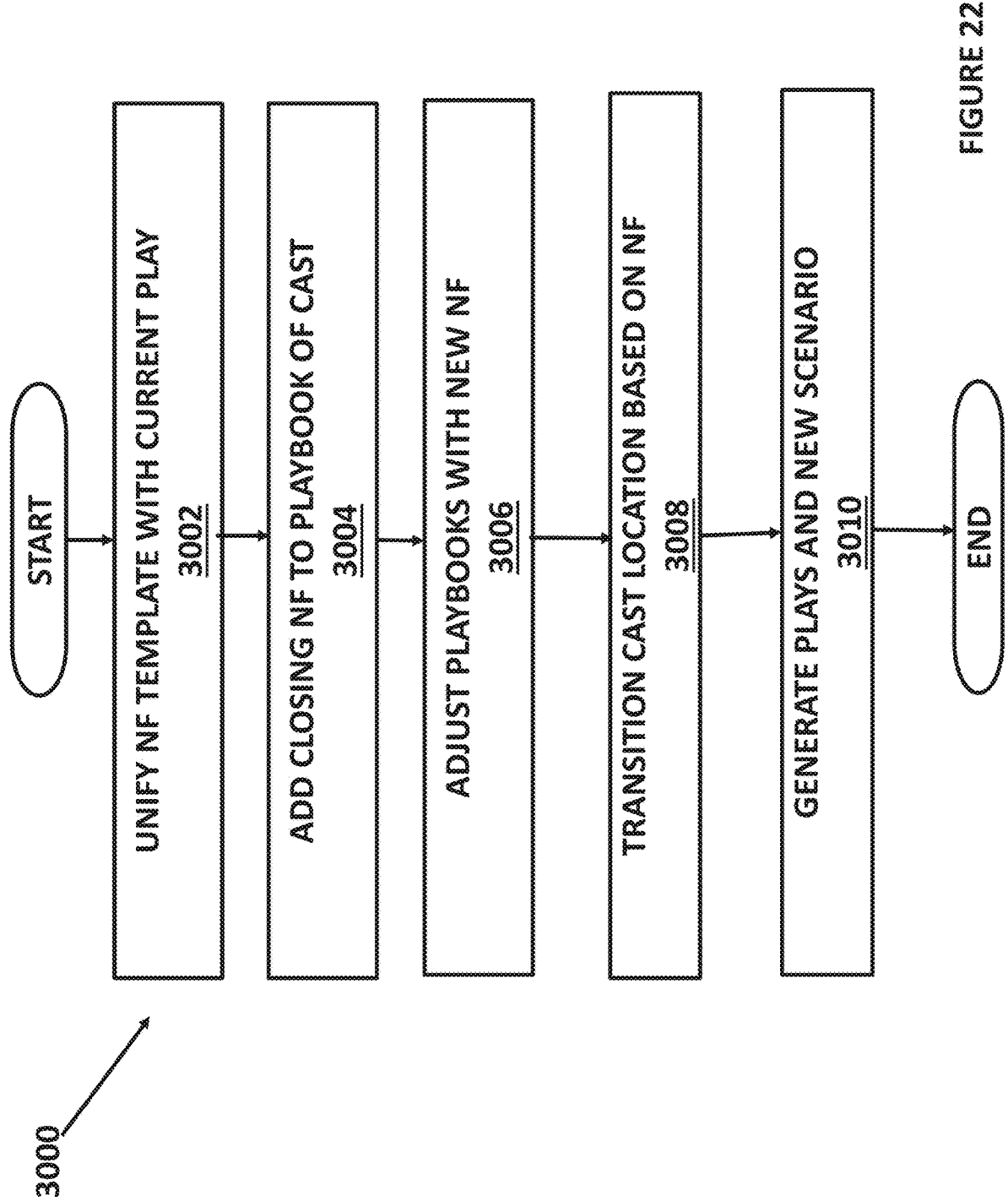

```
Blue Beard Scripts : {
    ...
    "trope": [
        "wife_serial_killer",
        "nefarious_seducer",
        "key_maniac",
        "decoy_killer"
    ],
    "foibles": [
        "boast_wealth",
        "check_locks",
        "check_keys",
        "complain_beard_color",
        "offer_visit_cabinet"
    ],
    "quotes": [
        "let me show you my cabinet of souvenirs",
        "would you like to visit my cabinet of curiosities?",
        ...
    ]
}

Ogre's scripts: {
    ...
    "trope": [
        "eat_children"
    ],
    "foibles": [
        "smell_raw_meat",
        "wet_knife"
    ],
    "quotes": [
        "I smell fresh meat",
        "there is something here which I do not understand",
        ...
    ]
}
```

FIGURE 23

Ogre's vector:
"vector": "0,1,0,1,0,0,0,0,0,0,0,0,1,0,0,0,0,1,1,0,0,0,1,0,0,0,1,0,0,0,1,0,0"

Blue Beard's vector is the closest match:
"vector": "1,0,0,1,0,0,0,0,0,1,0,0,0,0,0,1,0,0,0,1,1,0,0,0,1,0,0,0,1,0,0"

Ogre receives Blue Beard's social map:

```
...
"social": [
    {
        "name": "fairy_key",
        "status": 2
    },
    {
        "name": "brothers",
        "status": -2
    },
...
],
...
```

FIGURE 24

```
{
 "type": "trope",
 "name": "wife_serial_killer",
 "display": "wife serial killer",
 "logline": "{cast:ego}kills{poss:ego}spouses, one after the other",
 "device": "plot",
 "genre": [
  "mystery",
  "crime"
 ],
 "resolution": [
  "SEDUCE",
  "MARRY",
  "KILL"
 ],
 "trope": [],
 "ego": {
  "role": "agent",
  "gender": "male",
  "age": "adult",
  "ms": "single",
  "persona": [
   {
    "name": "adverse",
    "status": 1
```

FIGURE 25A

```
"alter": {
    "role": "patient",
    "gender": "female",
    "age": "adult",
    "ms": "single",
    "persona": [
        { "name": "na",
          "status": "" }
    ],
    "steps": [
        { "name": "seduce",
          "type": "action" },
        { "name": "marry",
          "type": "action" },
        { "name": "kill",
          "type": "action" }
    ]
}
```

FIGURE 25B

```
{
    "simplified": "THANK",
    "square": "ACCLAIM",
    "trans": "etrans",
    "semio": "assertive",
    "polarity": "positive",
    "action": "acclaim",
    "affect": {
        "vector": "like",
        "intensity": "1",
        "value": "notice"
    },
    "surface": {
        "concept": "admire",
        "verb": "acclaim"
    },
    "resolutions": {
        "assertive": {
            "resolution": "THANK"
        },
        "passive": {
            "resolution": "DISMISS"
        },
        "adverse": {
            "resolution": "DISDAIN"
        },
        "supportive": {
            "resolution": "PRAISE"
        }
    }
}
```

FIGURE 27

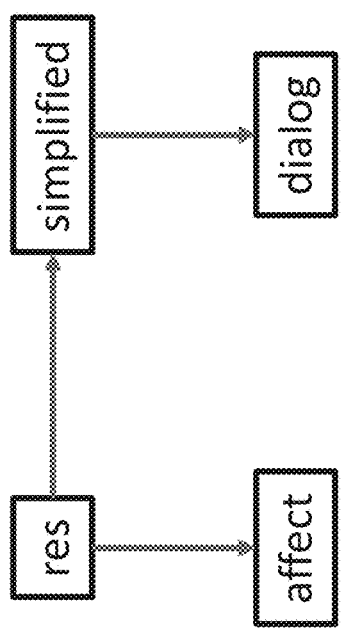

FIGURE 26

```
turn_play(action, agent, patient) ->
res_model(action, res)
simplify(res, simple_res, trans)
<simple_res, trans, agent, affect>
<simple_res, trans, agent, dialog> persona(patient, p)
simplified_resolution(simple_res, trans, p, r)
<r, trans, patient, affect>
<r, trans, patient, dialog_reply>
tropes(patient, lt)
<r, patient, script, lt>

<r, agent, script, new_script>
<r, trans, agent, dialog_closure>
```

FIGURE 33

Causal antecedent
"Why did BB ~w ?"
Goal orientation
"for what purpose did BB ~w ?"
Enablement
"How was BB able to ~w ?"
Causal consequent
"What happened when BB ~w ?"
Verification
"Did BB ~w ?"
Disjunctive
"Was it the wife or SisterAnne who ~w ?"
Instrumental/procedural
"How did BB ~w ?"
Concept completion
"What did BB say ?"
Expectational
"Why isn't BB ~w ?"
Judgmental
"What should BB ~w ?"
Quantification
"How many friends BB have ?"
Feature specification
"What color is BB beard ?"
Request
"What should I do ?"

FIGURE 34

5 questions
the agent's perspective
1. what happened
   -> fact
2. how?
   -> script, instrumental
3. why?
   -> NF/res
   why?
      -> DSID, see agent's decision below
      why?
         -> previous SID in EM or history
      -> random judgmental proverb, etc.
the patient's perspective
4. did it work?
   -> yes
   why?
      -> believable (except for change of states like kill)
   -> no
   why not?
      -> unbelievable, distrust etc.
5. next?
   -> patient persona + resolution model (keep it simple)

FIGURE 35

1. what happened?
   The wife's persona was passive, has been changed for adverse.
   The wife decided to kill Blue Beard. (the script played).

2. how?
   with poison. (the script played)

3. why?
   The wife wanted to confront Blue Beard. (NF)
   why?
      Because the wife had an obligation to retaliate. (DSID 1, obligation_to_retribute)
      Why?
         It goes back to when Blue Beard punished the wife. (obligation_to_retribute SID -> script)
         The wife resented that.

4. did it work?
   Yes. The wife succeeded.
   As a result, Blue Beard is dead. (property entailment)

5. what will happen next?
   The wife might rejoice.

FIGURE 36A

CC is a capped list of 6 (3 * 2)
CC: the causal chain of decisions made by each character on stage
 [[pid(PID),agent(AGENT),causal_link(CL),update_scenario(DSID,SID),believability(P,ARP,OUTCOME)]]
DSID: update_agent_playbook_ID, one of the 12 possible update scenarios
CL: a causal link, one of [result, reason,initiate,enable,lead_to,can_cause]
SID: the script is the decision
causal_chain has been asserted as:
 causal_chain([[pid(PID),agent(AGENT),causal_link(CL),update_scenario(DSID,SID)],...]) in
update_agent_playbook()
causal_chain has been updated as:

causal_chain([[pid(PID),agent(AGENT),causal_link(CL),update_scenario(DSID,SID),believability(P,ARP,OUTCOME)],...]
), in exec()
converted as:
 users:user_id:causal_chain:perrault_BlueBeard_1
 key: PID, {cast_id: {update_scenario: {DSID: DSID, sid: SID}, believability:
{semio:SEMIO,trust:TRUST,outcome:OUTCOME}}}

The causal chain is updated incrementally in exec.pl, from play to play. The new CCNODE is added left.

Answer
—— answer([question(what,[change(TEMPLATE,HOLDERS),decision(TEMPLATE,HOLDERS),back_when(TEMPLATE,HOLDERS)]
]),
question(why,[wanted_to(TEMPLATE,HOLDERS),because(TEMPLATE,HOLDERS),back_when(TEMPLATE,HOLDERS)]
]).

FIGURE 36B

```
what happened?
assertz(answer([question(what,[]),question(why,[])])).
answer(edit,what,[change(TEMPLATE,HOLDERS),decision(TEMPLATE,HOLDERS),decision(TEMPLATE,HOLDERS)])
display_change
    TODO: this part currently simplified to agent's persona
    display_change(TEMPLATE,HOLDERS) is asserted as a side-effect of swap_roles
    display_change(persona)
        format("The ~w persona was ~w, was changed for ~w.",[AGENT,OLDPERSONA,NEWPERSONA])
        >>> The wife's persona was passive, was changed for adverse.
    display_change(social)
        format("The ~w relationship with ~w is now ~w.",[AGENT,ALTER,NEWSOCIAL])
        >>> The wife's relationship with bluebeard is now negative.
    display_change(merge)
        format("The ~w has been merged with the ~w.",[AGENT,MERGER])
        >>> The wife has been merged with the ogre.
trace_decision
    trace_decision(TEMPLATE,HOLDERS) is asserted as a side-effect of exec
    trace_decision(agent)
        affect
            format("The ~w {affect:~w}.",[AGENT,AFFECT])
            >>> The wife {affect:enraged}.
        trace action
            format("The ~w {decides_to:~w}.",[AGENT,DECIDESTO,PATIENT])
            >>> The wife {decides_to:kill} bluebeard.
            format("The ~w {decides_to:~w}.",[AGENT,DECIDESTO])
            >>> The wife {decides_to:flee}.
    trace_decision(patient
        affect
            format("The ~w {affect:~w}.",[PATIENT,AFFECT])
            >>> The friends {affect:stern}.
```

FIGURE 36C

```
why? (why did it happen?)

answer(why,[wanted_to(TEMPLATE,HOLDERS),because(TEMPLATE,HOLDERS),back_when(TEMPLATE,HOLDERS)]).
  wanted_to
    wanted_to(TEMPLATE,HOLDERS) is asserted as a side-effect of exec
      format("The ~w {wanted_to:~w} ~w.",[AGENT,NF,PATIENT])
      >>> The wife {wanted_to:confront} bluebeard.
  because
    because(TEMPLATE,HOLDERS) is asserted as a side-effect of exec
      DSID = obligation_to_retribute
      format("Because the ~w had an obligation to {obligation:~w}.",[AGENT,OBLIGATION])
      >>> Because the wife had an obligation to {obligation:retaliate}.
      DSID = obligation_to_payback
      format("Because the ~w had an obligation to {obligation:~w},",[AGENT,OBLIGATION,PATIENT])
      >>> Because the wife had an obligation to {obligation:payback} bluebeard.
  back_when
    back_when(TEMPLATE,HOLDERS) is asserted as a side-effect of exec
      format("It goes back when ~w {decided_to:~w} the ~w.\nThe ~w {affect:~w}.",[PATIENT,DECIDEDTO,AGENT,AGENT,AFFECT])
      >>> It goes back when Blue Beard {decided_to:punish} the wife. The wife {affect:angry}.
```

FIGURE 36D

The core predicate can be stative or active:
stative = ego,be:cursed
active = ego,recover
"by", stative predicate and passive subject = ego,be:cursed;by:fairy.

The most straightforward clause is SV (intransitive clause), or SVO.
SVO: action is transitive: patient or object.
Patient and object are named: fairy, poison, or they are placeholders: somebody, something.
"Somebody" and "something" are used when the patient or the object are unknown.
note that "alter" is equivalent to "somebody",
and "fairy" is equivalent to somebody who be:fairy.

"O" answers the question: "what", "whom" or "about" depending on the nature of the object.
"whom", somebody = ego,kill;whom:alter
"what", something = ego,lose;what:slipper
 -whom, what:
      a patient can be found or summoned
              265         ego,want_to:           meet        whom:alter
                           -> find alter
      an object is owned or can be acquired
              527         ego,want_to:           throw       what:food
                           -> find food Give and receive: sender and receiver are animated (use start and end for physical transfer)
"to", receiver = ego,give;what:cursed_necklace;to:alter
"from", origin = ego,receive;what:pumpkin_cart;from:alter
   also source = ego,learn;from:third;that:alter,be:friend,ego

FIGURE 37A

Circumstantial
"bmo", instrument (something, by mean of) = ego,kill;whom:alter;bmo:poison
"with", cooperation (somebody) = ego,cooperate;with:alter
"into", transfiguration = ego,transfigure;whom:alter;into,frog
"over", advantage (somebody) = ego,win;over:alter
"where", destination = ego,want_to:leave;where:somewhere
"when", time = ego,want_to:leave;when:now
"how", manner = ego,want_to:leave;how:quickly Relative clause: complements the patient or the object, has no explicit subject
"who", constraint on somebody = ego,challenge;whom:somebody;who:somebody,be:enemy,ego
"which", constraint on something = ego,hide;what:something;which:something,be:fav,alter
-who, which
    satisfy the possible conditions introduced by "who" or "which":
    265    ego,want_to:    meet    whom:alter
who:alter,be:status, donor
    this is equivalent to:
        ego,want_to:    meet    whom: somebody
who:somebody,be:status, donor
    -> find whoever character has property
who and which match properties introduced by "be". No action.
TODO: only "be" forms

FIGURE 37B

Conjunctive subordinate clause: complements the predicate.
"that", complete clause = ego,suspect;that:alter,be:jealous,stepmother
ego,request;whom,alter;that:alter,help,ego
ego,prohibit;whom,alter;that:alter,kiss,stepmother
The embedded elements that follow the sub clause refer to the sub clause
ego,want_to:comply;that:alter,be:location,home;when:midnight
The embedded elements that precede the sub clause refer to the main clause.
ego,want_to:comply;when:now;that:alter,be:location,home
The previous "about" (gossip;about:cooking) is now a full subordinate clause introduced by that:
ego,want_to:gossip;to:alter;that:somebody,love;whom:alter Interrogative form with a question mark, in place of "that".
"who?" "why?", "how?"
ego,ask;whom,alter;who?:somebody,kill,fairy
ego,ask;whom,alter;why?:somebody,kill,fairy
ego,ask;whom,alter;how?:somebody,kill,fairy

FIGURE 37C atrans: the transfer of an abstract relationship, e.g., ownership.
-> obligation to payback
btrans: a deal, e.g. a marriage proposal.
-> obligation to respect the terms of the deal.
ctrans: the complicity to a conspiracy
obligation to cover-up
etrans: the emotional response to the situation
obligation to react adequately to an emotion
gtrans: the gaslighting of the patient
obligation to believe the gaslighted suggestions and resolve accordingly
jtrans: an injunction to do something
-> obligation to comply
mtrans: the transfer of knowledge
obligation to leverage intel
ptrans: the physical transfer
obligation to adapt to the destination
qtrans: the quest of something coveted or missing
obligation to search and find
strans: the establishment of a social relationship
obligation to reciprocate a social engagement
ttrans: the transition between contracts
obligation to step back and justify actions
utrans: the establishment of a trustful relationship
obligation to believe the one who is trusted
wtrans: the pursuit of happiness
obligation to achieve personal goals
xtrans: the confrontation of foes
obligation to retaliate

FIGURE 38 want
  request
    accept
      comply
        provide help
          confrontation with the villain
            victory
              reparation
        transgress
          retribution
            reparation
    reject
      resentment, obligation to retaliate
deceit
  grief
    request for help
      accept
        confrontation with the villain
          expose
            reparation
      reject
        resentment, obligation to retaliate

FIGURE 39

```
why? (why did it happen?)
- - - - - - - - - - - - - - - - - - - -
answer(why,[wanted_to(TEMPLATE,HOLDERS),because(TEMPLATE,HOLDERS),back_when(TEMPLA
TE,HOLDERS)]).
    wanted_to
        wanted_to(TEMPLATE,HOLDERS) is asserted as a side-effect of exec
            format("The ~w {wanted_to:~w} ~w.",[AGENT,NF,PATIENT])
            >>> The wife {wanted_to:confront} bluebeard.
    because
        because(TEMPLATE,HOLDERS) is asserted as a side-effect of exec
            USID = obligation_to_retribute
            format("Because the ~w had an obligation to {obligation:~w}.",[AGENT,O
BLIGATION])
            >>> Because the wife had an obligation to {obligation:retaliate}.
            USID = obligation_to_payback
            format("Because the ~w had an obligation to {obligation:~w} ~w.",[AGEN
T,OBLIGATION,PATIENT])
            >>> Because the wife had an obligation to {obligation:payback} bluebea
rd.
    back_when
        back_when(TEMPLATE,HOLDERS) is asserted as a side-effect of exec
            format("It goes back when ~w {decided_to:~w} the ~w.\nThe ~w {affect:~
w}.",[PATIENT,DECIDEDTO,AGENT,AGENT,AFFECT])
            >>> It goes back when Blue Beard {decided_to:punish} the wife. The wif
e {affect:angry}.

answer([question(what,[change(TEMPLATE,HOLDERS),decision(TEMPLATE,HOLDERS),decision(TE
MPLATE,HOLDERS)]),
        question(why,[wanted_to(TEMPLATE,HOLDERS),because(TEMPLATE,HOLDERS),back_when(
TEMPLATE,HOLDERS)])
       ]).
```

FIGURE 40

SYSTEM AND METHOD FOR EXECUTING AND MANIPULATING A STORYLINE

PRIORITY CLAIM

This application claims the benefit under 35 USC 119 and is a continuation of PCT Patent Application PCT/US2021/038506 filed on Jun. 22, 2021 that in turn claims priority under 35 USC 119(e) to U.S. Provisional Patent Application No. 63/043,701, filed Jun. 24, 2020 and entitled "SYSTEM AND METHOD FOR EXECUTING AND MANIPULATING A STORYLINE", the entirety of all of which are incorporated herein by reference.

APPENDICES

Appendix A (7 pages) contains an example of the user interaction with the SAM element that forms part of the specification.

FIELD

The present disclosure relates to a gaming platform that processes and executes a storyline based on a screenplay.

BACKGROUND

Gaming platforms exist in which a proprietary game may be generated in which the story, the characters, etc. of the game are generated by the company. There also exist games in which a user can edit a story and a storyline and affect the game play. There existing systems have a limited number of edit choices (less than 5 often) and use a very simplistic decision tree to affect the change in the storyline based on the decision choice by the user. Thus, even in these systems, the decision and the results of the limited decision choices are programmed by the company.

It is desirable to provide a gaming platform in which the user can change the storyline of the story of the game with a larger or even unlimited number of choices. The limited number of choices in the existing systems means that the user is limited in the selection of decision choices and cannot really adjust the storyline in various different ways. It is further desirable for the system to be able to adjust the storyline automatically based on whatever decision choice is selected by the user. These are technical problems with existing game systems and can be overcome by a technical solution described below. Thus, it is desirable to provide a system and method for executing storylines in a game that achieves and overcomes the above limitations and technical problems of the existing systems and it is to this end that the disclosure is directed.

BRIEF DESCRIPTION OF THE DRAWINGS

FIGS. 7A-7D illustrate an example of the play input and play interpreted and defined as a JSON stored in system;

FIG. 9 illustrates an example of the screenplay data structure which in one example may use the JSON format;

FIGS. 11 and 12 illustrates two examples of the semiotic resolution models/rules;

FIG. 13 illustrates an example of the narrative function model/rules;

FIG. 14 illustrates an example of the NC ontology for a Cinderella character;

FIG. 15 shows an example of a tropes ontology for a decoy killer trope ontology;

FIG. 16 illustrates an example of direct reported fact outcome for a character;

FIG. 17 illustrates an example of indirect reported fact outcome for a character;

FIG. 18 illustrates an example of the intent and belief dialog for an indirect reported fact outcome for a character;

FIG. 19 illustrates an example of the fact outcomes that includes the assumed intent of the agent;

FIG. 20 illustrates an example of Prolog code that implements the prorogation rules of the SAM;

FIG. 21 illustrates the method for scene adjustment in the system;

FIG. 22 illustrates a motif transfer that is part of the scene adjustment process;

FIG. 23 illustrates an example of a charter scripts for a merger character;

FIG. 24 illustrates an example of a cast transfer process;

FIGS. 25A and 25B illustrate an example of the motif transfer process;

FIG. 26 illustrates an example of a resolution model;

FIG. 27 illustrates an example of a resolution ontology;

FIG. 33 illustrates an example of the pseudocode for the play editing process using the scene adjustment mechanism of the system;

FIG. 34 illustrates causal chain questioning templates;

FIG. 35 illustrates a simplified causal chain questioning templates;

FIGS. 36A-36D illustrate a simple example of the causal chain;

FIGS. 37A-C illustrate an example of simplified resolution/script clauses that may be part of the system;

FIG. 38 shows the types of contracts that are part of the system;

FIG. 39 shows an example of a cycle of resolution in the system;

FIG. 40 illustrates an example of the AI engine obtaining answers for why question in connection with the causal connection aspect of the system.

DETAILED DESCRIPTION OF ONE OR MORE EMBODIMENTS

The disclosure is particularly applicable to a cloud resources based system implemented using PROLOG based artificial intelligence that generates a screenplay from a text of a book and it is in this context that the disclosure will be described. It will be appreciated, however, that the system and method has greater utility since it may be used to generate, manipulate and execute a screenplay generated from various different forms of text and the methods disclosed may be implemented in other known manner using other AI techniques, other programming languages or it may be implemented using hardware devices and elements. The system and method described below is a technical solution that allows an infinite number of choices of the user to adjust the storyline and then automatically adjusts the storyline for the game play of the user. Furthermore, the system and method are a technical improvement over known gaming systems and system user a decision tree to adjust the storyline of the game as described in detail below. In one exemplary embodiment, artificial intelligence resolution logic (using tropes and ontologies) may be used to receive the user choices and then adjust the storyline for each user.

Figure 1:
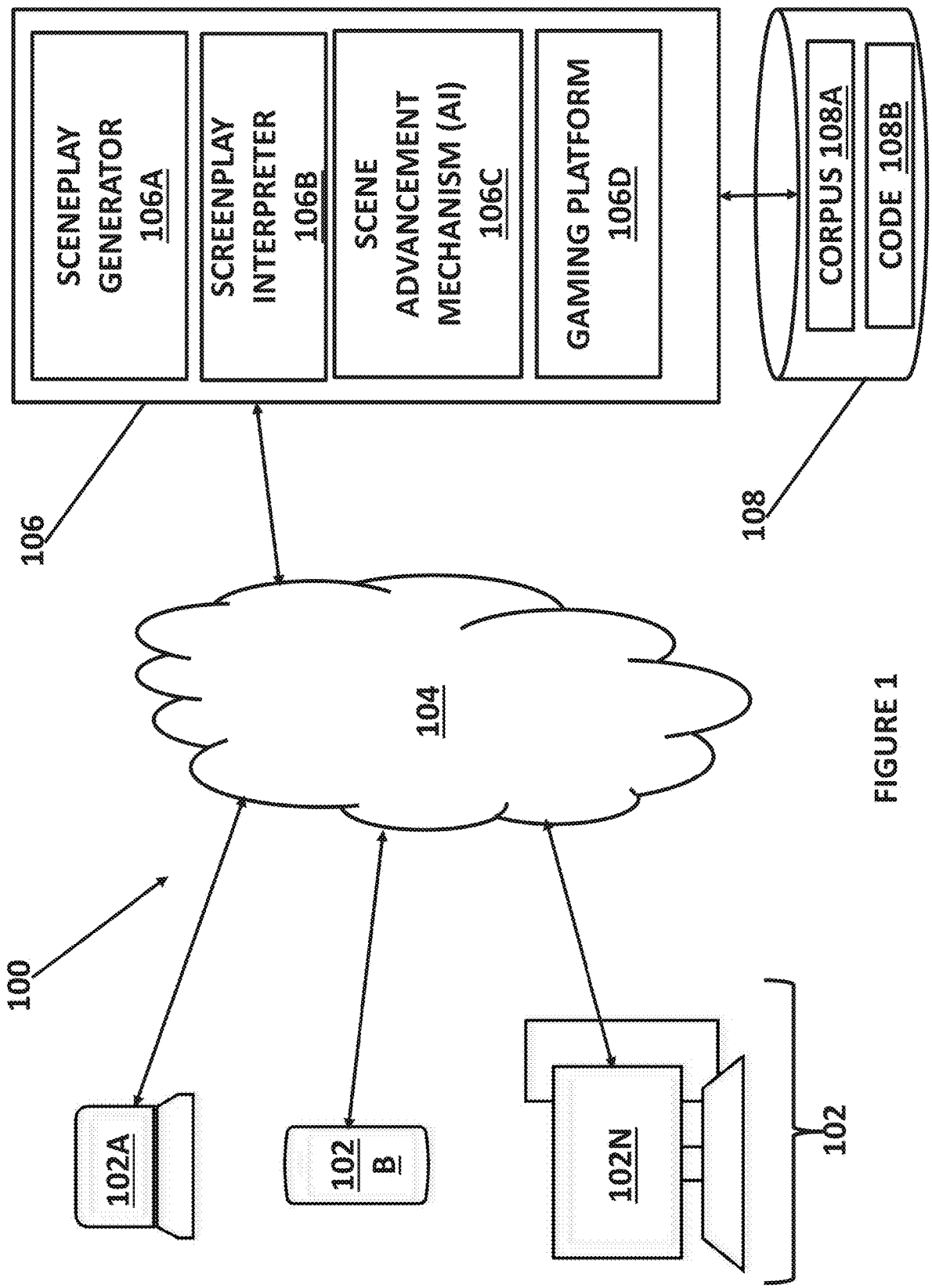
FIG. 1 illustrates an example of an embodiment of a system for generating, executing and manipulating a screenplay.

FIG. 1 illustrates an example of an embodiment of a system 100 for generating, executing and manipulating a screenplay that starts with a piece of text wherein the text may be a book, a fairytale, article or any other type of text. The system may perform various novel and not well understood operations including the generation of a corpus from the piece of text from which a screenplay may be generated, the generation of a conceptual dependency as detailed below, the generation of a play and screenplay from the corpus and the conceptual dependency using artificial intelligence (C# inside a Unity commercially available system in one implementation), executing the screenplay and the execution of store advancement monitoring as described below. The system may include one or more computing devices 102 that establish a connection with and communicate over a communication path 104 with a backend system 106 to provide the above novel, not well understood and not routine procedures.

Each computing device 102 may be a processor based device that is able to connect to and communicate with the backend system 106. In one implementation, the known JSON data format may be used. The communication with the backend 106 may include the delivery of a piece of text to the system for the generation of a screenplay as described below, the interaction with the backend system 106 during the execution of a screenplay and/or an exchange of user interfaces with the backend system 106. For example, as shown in FIG. 1, the one or more computing devices 102 may be a laptop computer 102A, a smartphone device 102B (such as an Apple® iPhone® product or an Android® operating system based device), a server computer, a terminal device, a tablet computer or a personal computer 102N. Each computing device 102 may have at least one processor, a memory (persistent or temporary or both), a set of communication circuits (wired or wireless) that allow the device to connect to and communicate over the communication path 104 and a display. Each computing device 102 may further comprise an application, browser, mobile app, etc. to facilitate the connection and communications with the backend 106. The structures of each computing device 102 are known, conventional and routine, but the procedures and processes performed (for the screenplay) using each computing device are not routine, not well known and not conventional as described in more detail below.

The communication path 104 may be one or more wired or wireless systems/networks that can be coupled to by each computing device 102 and used to communicate data with the backend system 106. For example, the communication path 104 may comprise a cellular network, a wireless digital data network, a wireless data network, a WiFi network, a wired network like Ethernet alone or in combination that collectively use a connection and data transfer protocols to exchange data. For example, the communication path 104 may be TCP/IP and HTML, but is not limited to particular protocols. The structures of the communication path 104 and the protocols are known, conventional and routine, but the procedures and processes performed (for the screenplay) using the communication network are not routine, not well known and not conventional as described in more detail below.

The backend 106 may be implemented using one or more known and routine computing resources to perform the unconventional screenplay processes described below. For example, the computing resources may be one or more server computers, one or more cloud computing resources, one or more blade servers and the like. The processes performed in the backend 106 may be implemented in hardware or software. When the processes are implemented in hardware, each of the processes 106A-106E may be a hardware device/circuit that performs the processes described below. When the processes 106A-106E are implemented in software as shown in FIG. 1, each process may be implemented using a plurality of lines of computer instructions/code that may be executed by a processor of the backend 106. The implementation and computer instructions are conventional and routine. However, the screenplay processes that are performed are not well understood or routine. The system may also include a store 108, implemented in hardware or software, that may include a database that stores various data used by the system. For example, a corpus 108A may store each story/storyline and may be used to generate each screenplay, the code 108B when the system is implemented in hardware, the pieces of text, the screenplays, etc. may be stored in the store 108.

Figure 2:
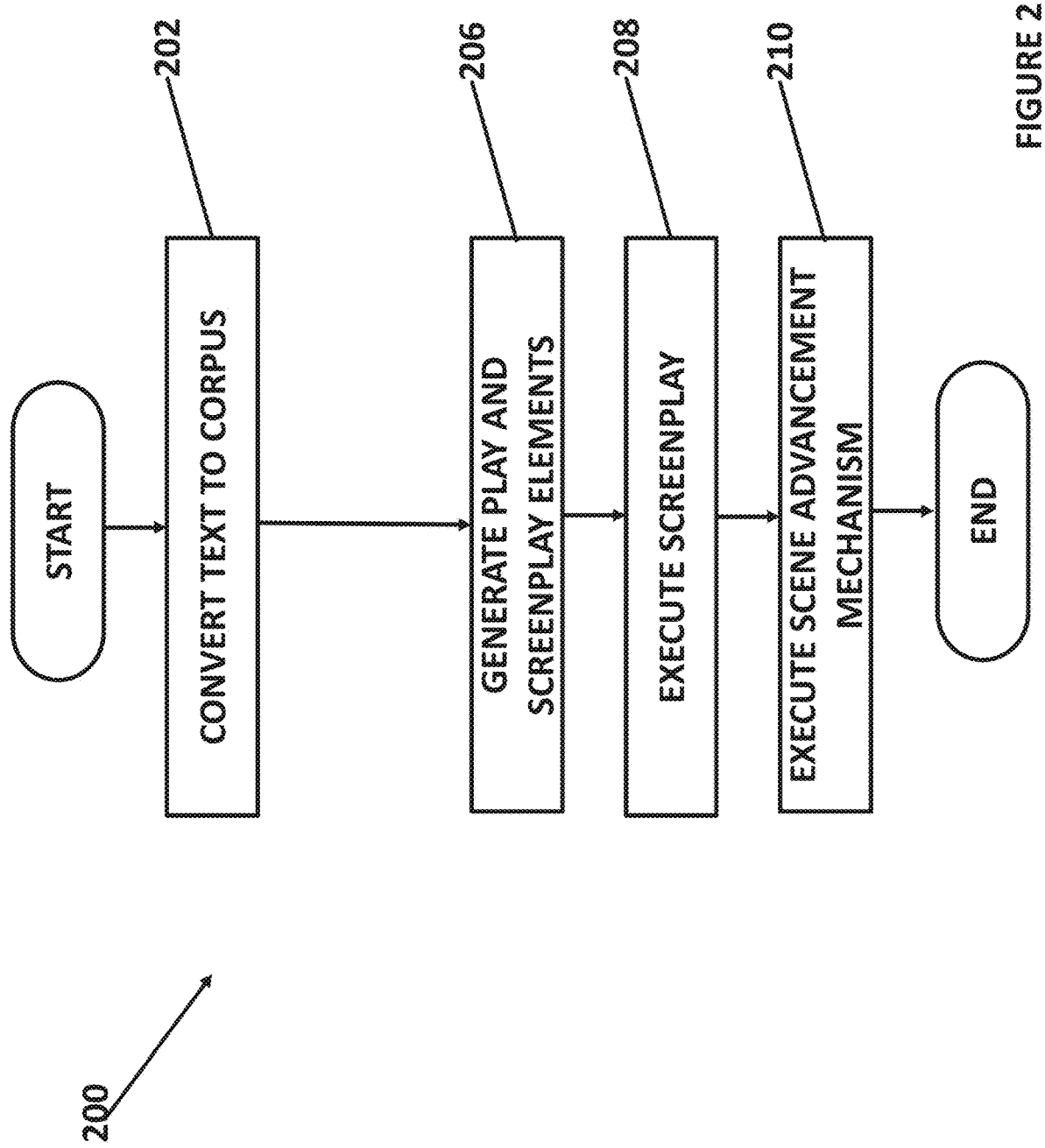
FIG. 2 illustrates a method for generating, executing and manipulating a screenplay.

The backend system 106 may further comprise elements 106A-106D that are not conventional and not routine since known systems cannot take an existing piece of text and generate the novel screenplay and adjust the scenes. Each elements 106A-106D (and the user interface generator) may be a plurality of lines of computer code/instructions that may be executed by a processor of the backend 106 to perform each of the processes for each element. The backend 106 may include the screenplay generator 106A that may perform the process, shown in FIG. 2, of generating the screenplay that may be used by the gaming platform. In one example shown in FIG. 2, this screenplay generator 106A may convert text to corpus 202 and generate the play (process 206) as described below in more detail. The backend 106 may further include the screenplay interpreter 106B that generates the screenplay elements (including background, cast, animation, voice-over, dialogue, emotion, floorplan and stickers for example) from the screenplay (process 206). The backend 106 may further comprise the scene advancement mechanism (SAM) 106C that adjusts and advances the scene and game play (process 201 in FIG. 2) based in part on the user's input during the game play. The gaming platform 106D may implements the game and its user interface that are provided to each user so that each user has a unique game play experience based on the user interaction with the backend system 106. Alternatively, the elements 106A-106D (and a user interface module/element that generates the user interfaces of the game that are communicated to each user) may be collectively known as a gaming system or gaming platform (shown as the backend system 106 in FIG. 1) that perform the processes of generating of the screenplays from each piece of corpus for a game, executing the game play based on the screenplays and its storyline, receiving a user choice to adjust the storyline, adjusting of the storyline automatically and generating of the adjusted storyline and game play for each user.

Figure 3:
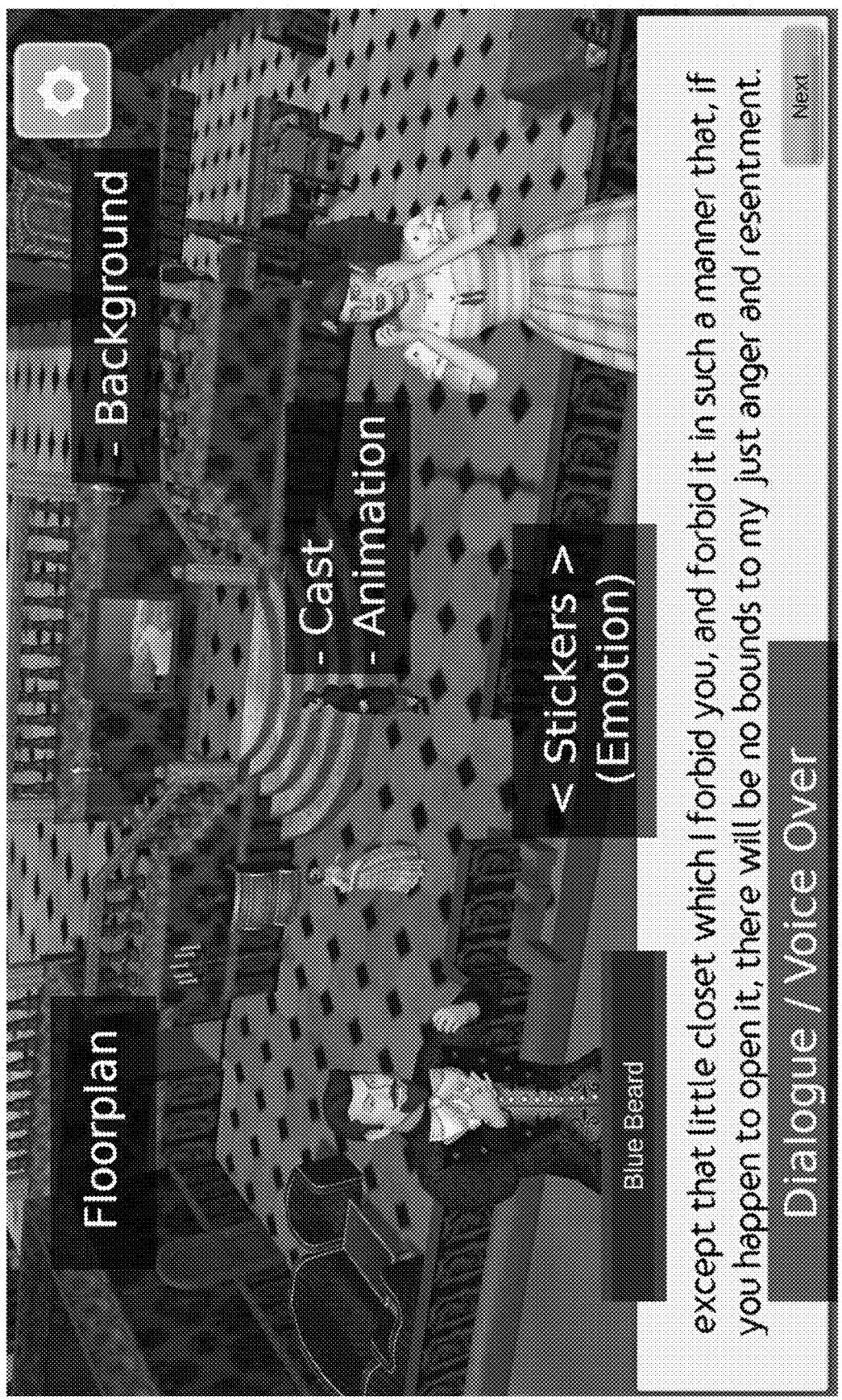
FIG. 3 illustrates an example of the game platform elements generated from the screenplay.

FIG. 3 illustrates an example of the screenplay elements where, to execute the screenplay, any element referenced by it has to be previously compiled into the Gaming Platform (GP) and the ontology of casts, places and animations that then have to be shared between the GP and the Scene Advancement Mechanism (SAM) as described below in more detail. From a visual perspective as shown in FIG. 3, the Gaming Platform has two main layers including a Floorplan and Stickers which are labeled in FIG. 3 that may be combined together visually during the game plan of the user. The Floorplan layer is where the whole Cast of characters convey their actions via various Animations. The story happens in a context: this is the Background (e.g. courtyard, castle, mansion entrance, dining hall). The Stickers layer is overlaid on top of the floorplan, focuses on the character Emotions (particularly on facial expressions), and shows text for either Dialogue or a Voice Over.

Figure 4:
FIG. 4 illustrates an example of a background game platform element generated from the screenplay.

FIG. 4 illustrates an example of a background game platform element generated from the screenplay. The background game platform element may include Static Buildings, Decoration, Props and/or Visual Effects. The background game platform element may provide navigation for the Cast of the storyline and provide Key locations: Spots.

Figure 5:
FIG. 5 illustrates an example of a cast game platform element generated from the screenplay.

FIG. 5 illustrates an example of a cast game platform element generated from the screenplay. The cast element may include one or more characters who are part of the storyline. Each character may be generated using 3D Meshes and/or Models, one or more textures and a large set of Animations. The cast game platform element also support one or more Scripts for synchronizing all of the game platform elements.

Figure 6:
FIG. 6 illustrates an example of a stickers game platform element generated from the screenplay.

FIG. 6 illustrates an example of a stickers game platform element generated from the screenplay. Each sticker may include a Character of the cast closeups and may portray Emotions deeply as shown in the example in FIG. 6 by the anguished look on the face of the character. Each sticker may focus on facial expressions, have Shape Keys and transition between them. As in known in the animation art, the shape keys allow a three dimensional (3D) model to morph or reshape and each character has a set of shape keys for the different emotion. Furthermore, many shape keys might be combined together to reach a particular facial expression. Now, the processes to generate the game platform elements shown in FIGS. 3-6 are described in more detail.

Figure 7:
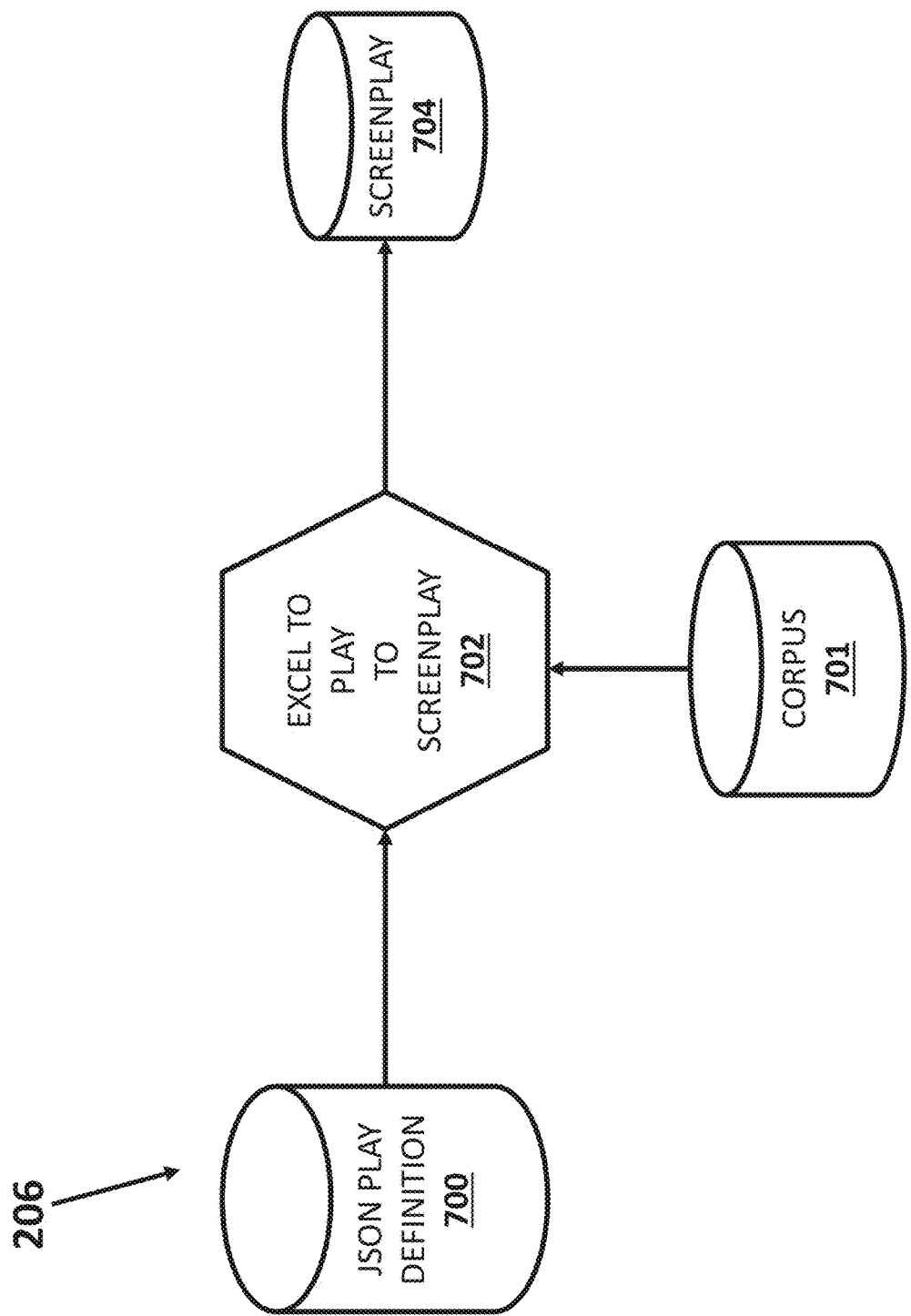
FIG. 7 illustrates more details of example of a method for generating a screenplay from the play.

FIG. 7 illustrates more details of example of the method 206 for generating a screenplay from the play. As shown, the play input is collected from an Excel spreadsheet, filled by human curators after reviewing the original document. Each row of the spreadsheet describes one "play", i.e. a situation involving an agent, and optionally a patient, as stated in one logical clause, inside one original sentence. The collection of each row from the spreadsheet involves an interpretation of the situation, and the entailment of the underlying changes for the characters on stage: persona, social map, etc. These changes are interpreted as "features" in the vector of features for each character on stage for that play. After its reconstruction from the Excel tabular input, the play definition (having all of the usual play elements like a cast, staging, dialog, camera shots, etc. may be stored in a data structure 700, such as a JSON play definition as shown in FIG. 7. FIGS. 7A-7D illustrate an example of the play input and play interpreted and defined as a JSON stored in system.

The play definition 700 may be stored in a data store (hardware or software database or other data storage) and be input into the process to generate the screenplay. The method 206 may further include a corpus 701 that is generated and stored as described immediately below. The play definition 700 and the corpus 701 may be fed into a screenplay generator process 702 that generate the screenplay and stored it in a screenplay store 704. An example of a portion of a generated screenplay is shown in FIG. 9 and described below.

Screenplay Execution Method

Figure 8:
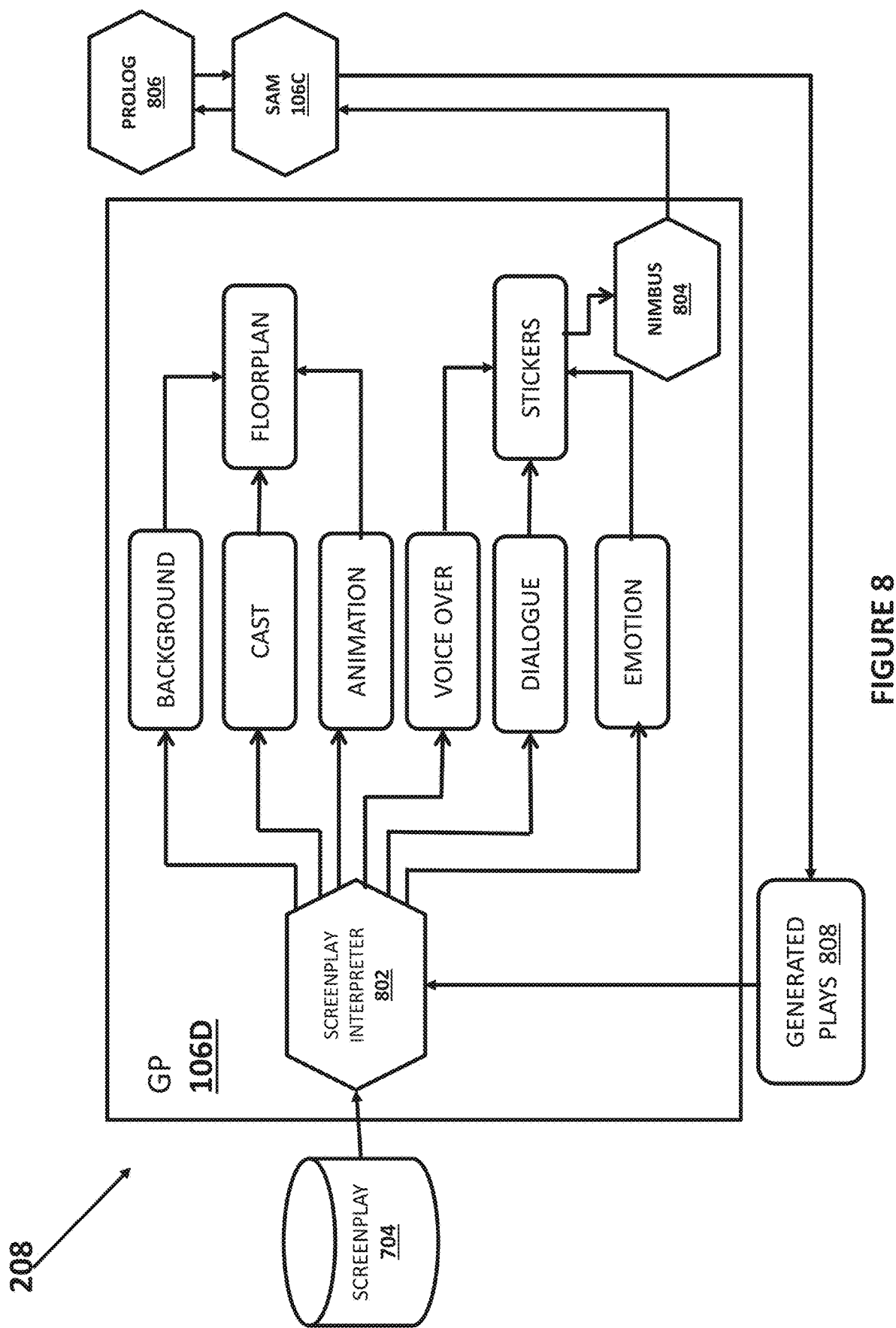
FIG. 8 illustrates more details of example of a method for screenplay execution.

FIG. 8 illustrates more details of example of the method 208 for screenplay execution. Using the screenplay 704 that was generated from the story as shown in FIG. 7 or a screenplay previously stored in a database, the game platform 106D may process that inputted screenplay to generate the elements used for the game play. In a first step, the screenplay (an example of the data format of which is shown in FIG. 9 (a JSON data format for example)) may be processed by a screenplay interpreter 802 that may be implemented, in one embodiment, as a plurality of lines of instructions/code that may be executed by a processor of the computer system that hosts the gaming platform 106D.

The screenplay interpreter 802 may request and parse the data format of the screenplay (JSON structure in one embodiment) that represents a screenplay (an example of which is shown in FIG. 9). A screenplay is mainly a sequence of scenes, which specify a background, cast and a sequence of plays on them. Each play represents a line of dialogue or voiceover, a set of sticker expressions and movements and animations for the floorplan cast. The talk of the screenplay interpreter 802 includes sequentially playing through each scene and each play within, controlling the playback of the entire story: triggering animations, making characters move, changing backgrounds, cutscenes, updating stickers and their expressions, displaying the current dialogue or voice over text, and so on. The screenplay has an interactive process as well since a user playing the game (a player) can request modifications to the story (described in detail below with respect to FIG. 10) cast through a recorder 804, a GUI device to interact with SAM 106C. In turn, SAM 106C (external to the GP and tightly connected with an artificial intelligence operating system and knowledge base 806 and dynamically generates new variants of the screenplay, which are received by the Screenplay 802 Interpreter. Thus, the Screenplay Interpreter 802 should be flexible enough so that it can gracefully handle these freshly generated plays.

As shown in FIG. 8, the screenplay interpreter 802 may generate the various game play data elements (See examples in FIGS. 3-6 described above) from the screenplay including the background, the cast and the animations, one or more of which are integrated into the floorplan for a particular play or scene of the game play and the voice over, the dialogue and the emotion, one or more of which are integrated into the stickers for a particular play or scene of the game play. The process shown in FIG. 8 may occur for each play/scene in the screenplay as well as when the player/user adjusts the story as described below. Those game play elements may be input into a recorder element 804 that generates/records the screens for the game play based on the elements generated by the screenplay interpreter 802. In one embodiment as shown in FIG. 8, the recorder 804 may be the commercially available Nimbus Web Nimbus screenshot and screen video recorder.

The recorded/generated scene/play generated by the recorder 804 may be fed back to as generated plays 808 to the screenplay interpreter 802 so that the screenplay interpreter 802 can generate a new play/scene based on modifications made by the user/player using the scene adjustment mechanism (SAM) 106C. The SAM 106C may, as described below in more detail, allow the player/user to adjust the story/game play and those adjustments are communicated to the recorder 804. An artificial intelligence operating system and knowledge base 806, such as Prolog, is connected to the SAM 106C, receives the user/player actions and implements the modifications made by the user/player as described below in more detail. Note that the recorder 804, SAM 106C and Prolog 806 may each be implemented as a plurality of lines of computer code/instructions executed on a processor of the gaming platform that configure the processor to perform the operations/processes described herein.

Figure 10:
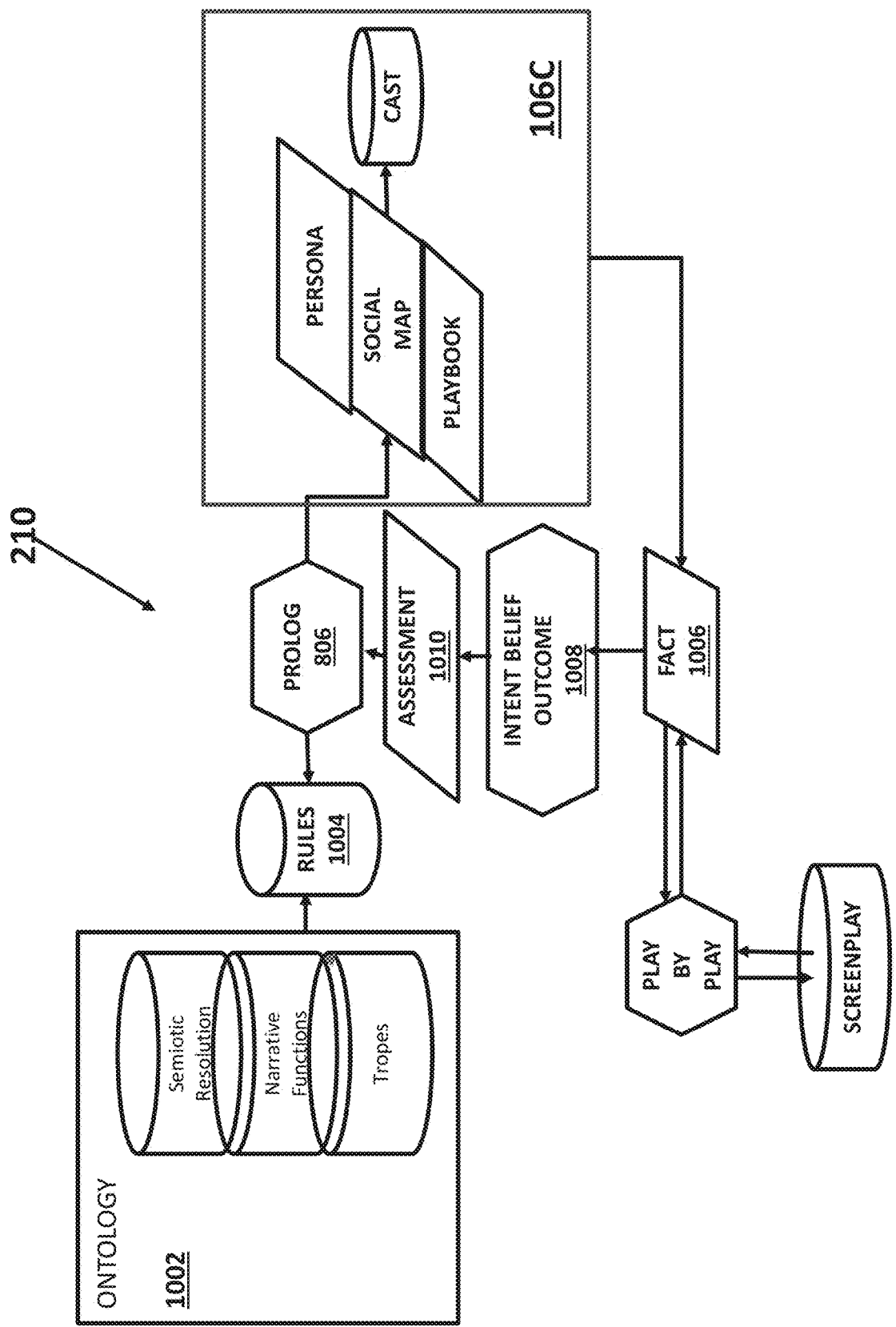
FIG. 10 illustrates more details of example of a method for story advancement monitoring.

FIG. 10 illustrates more details of example of a method for story advancement monitoring method 210 that is used to modify/adjust the story and the game play based on a user/player's actions. The result of the SAM 106C is that each user/player may have a unique game play experience based on the adjustments made by each user. Alternatively, the game play for each user may be similar, but certain parts of the game play may be customized for each user/player.

To execute the screenplay, any element referenced by the screenplay (see game play element examples in FIG. 8) has been previously compiled into the Gaming Platform (GP) and the ontology of casts, places and animations has to be shared between the GP and the Scene Advancement Mechanism (SAM) 106C. The game platform may have one or more elements that participate in the execution of the screenplay.

Scene Adjustment Mechanism (106C)

The above elements are used to generate the screenplay from the play that allows the user to "play" the game based on the play and screenplay. Thus, the story is played at face value on the gaming platform using the above described above. The SAM 106C, shown in more detail in FIG. 10, will now be described in more detail and, using AI, is able to rebuild a coherent narrative when the user/player modifies the cast or the screenplay. In order to monitor properly the advancement of the story, SAM 106C needs to have a representation of the narrative structure behind each story. SAM combines three sets of rules (in the ontology 1002 or as part of the ontology 1002 as shown in FIG. 10) to decide how the characters react to any given situation. The sets of rules are:
1. Semiotic "resolutions"
2. Narrative Functions and Narrative Closures
3. Motifs and tropes SAM 106C combines these 3 sets of rules to maintain the story coherence when the user modifies the cast or the screenplay.

Semiotic Resolutions

A "resolution" is a semiotic model defining how the character handles the situation, depending on their persona. There are 35 models, combined with four characters personae (assertive, passive, adverse, supportive) to produce 140 possible resolutions. Two examples of these semiotic resolution models/rules are shown in FIGS. 11 and 12.

Narrative Functions

The fact that all stories, whichever genre they belong to (fairy tales, news, novels, etc.), unfold the same canonical "functions" is well established. Vladimir Propp has been the first to enumerate these narrative functions (NF) in the context of fairy tales (and later by others for all other genres of stories) as described in Propp, V., 1928, *Morfologija skazki*, Leningrad, Akademia; 1968, *Morphology of the folktale* (Scott, L., Trans.), University of Texas Press. After an "initial (situation"(α)) that launches the story, a hero goes through various fortunate or unfortunate events to finally find closure. An example of the set of narrative functions is shown in FIG. 13.

Narrative Closures

The Propp article cited above sparked an interest of structural linguists who showed that the list of functions above was made of reciprocal pairs of functions, such as for example: call for the hero/acceptance of the hero, prohibition/transgression, etc. Instead of trying to regroup similar circumstances, the structuralists approached the problem from the functional standpoint. Starting from Propp's 31 narrative functions, Levi-Strauss (Lévi-Strauss, C., 1973, "La structure et la forme", *Anthropologie structurale deux*, Plon, 139-173) first paired reciprocal functions, e.g. prohibition/violation, and then noticed that the prohibition was the negative transformation of the injunction. Greimas (Greimas, A. J., 1966, *Sémantique Structurale*, Larousse; 1983, *Structural Semantics* (McDowell, D., Schleifer, R., Velie, A. Trans.), University of Nebraska Press) pursued the reduction (1966/1983:266), and considered that the injunction was the function behind Propp's "mandate of the hero, itself coupled with the hero's acceptance. In Greimas" fairy tale formula, the core of the story became a double opposition between the contract established, defined as mandate/acceptance, and the contract breached, defined as prohibition/violation. These authors wanted to discover the "holy grail" of the fairy tales, the magic formula that would crack open the logic of tales and myths. It is dubious that they did more than a rhetorical tour de force, soon forgotten. What remains valid though is the discovery of the NF polarity, that was a true progress compared to Propp's litany of functions. From that perspective, each pair of NF can be considered as a "motif", albeit of a different nature than the tropes: stock structural pairs vs. stock topics.

The structural pairs of narrative functions are the Narrative closures (NC). Once the narrative functions are reorganized in structural pairs, it becomes clear that: A story combines these pairs at will as discussed in Propp, V., 1928, "Transformacii volshebnykh skazok", *Poetika*, Vremennik Otdela Slovesnykh Iskusstv, IV, 70-89 and Vogel, C., 1977, "Permanence et changement: la proliferation du récit", *Krike-krake recueil de contes créoles réunionnais*, 93-103. Once a pair is initiated, its reciprocal part becomes necessary. The freedom of these combinations legitimizes the system's approach of procedural narratives. The tropes (figures of rhetoric) used by the storyteller to combine the NC may include Sequence, Embedding, Parallel, Alternate, etc.

NC Ontology

The system does not follow the rationale used by conventional typology of motifs like the ATU (Aarne-Thompson-Uther Classification of Folk Tales), but instead uses an ontology 1002 of NC, defined as closures of NF, and we define tropes as instances of these NC, with additional pragmatics. For example, for the character Cinderella, the example NC ontology is shown in FIG. 14. The pragmatics may include:

Satisfaction
initial situation
   misery, handicap, craving, absentation, jealousy, frustration, lost property, etc.
closure
   transfiguration
   wedding
   riches, happiness
   Quest
requirement
execution
   reward
   Interdiction injunction violation punishment
   Villainy
abuse
   coercion, taunting, enslavement, etc.
revenge
   punishment, etc.
   Call for help
hero call, fairy call, sprite call
acceptance
   Journey
departure
triumphal return, forgotten hero, incognito return
   Donation
donor encounter, witch encounter
   trial
   answer
donor gift
   gift, revelation, hindsight
   Trial
test
hero answer
   hero failure
   Knowledge
knowledge donation
gifted achievement
   Spell
   cast spell
   enchantment, fascination, etc.
spell falls upon
break spell
   Inquiry
search: eavesdropping, surveillance, etc.
   fortuitous discovery, happenstance
disclosure: confession, prediction, warning, etc.
   exposure: false information, false pretenses, etc.
   Trickery
make-believe: fabulation, camouflage, masquerade, etc.
exposure or success
   Transfiguration
gifted transfiguration, cursed transfiguration
reverse transfiguration
   missed transfiguration
   Combat
fight
   mark
   wound
   healing
victory
   deliverance
   retreat
   pursuit
   rescue
   Forgotten hero
ordeal
recognition
   exposure of false heroes Motifs Similar to folklore tradition (See Wikipedia, "Motif (folkloristics)" en.wikipedia.org/wiki/Motif_(folkloristics))), a motif may be a narrative pattern. The folklorist's motifs are defined by their accessories and circumstances. For example, the "sleeping Beauty" motif is classified as "Tales of Magic/Supernatural or Enchanted Wife (Husband) or Other Relative/Wife/The Sleeping Beauty" in the ATU (Aarne-Thompson-Uther Classification of Folk Tales) (Quoted from the "Multilingual Folktale Database" (www.mftd.org). The six tales sharing the Sleeping Beauty motif are actually very different. Only three of these tales can arguably be grouped together: "sun, Moon and Talia" from Basile, and the 2 versions of Perrault and the Grimm brothers. If we look closer, we see that the three tales combine different motifs: Perrault and Basile add an ogress motif, willing to eat the children resulting from the prince and the sleeping princess union, whereas the Grimm brothers limit their story to the enchantment and awakening of the princess. Basile doesn't use the fairy's motif, while both Perrault and Grimm do, and all three use the "spindle" motif.

Tropes

The tropes that are part of the ontology 1002 shown in FIG. 10 may be produced from the different motifs as described above. Tropes are "clichés", "lieux communs", "commonplaces": stock topics that are so frequently found that they become part of the fairy tale storyteller's rhetorical arsenal. "The Sleeping Beauty" as somebody who is put to sleep for some reason and awakes after a kiss, is a stock topic. If it's not a princess, but say a pig, the trope will still be recognized. Both a metaphor and a template, the trope can easily be transferred and adjusted. Another property of tropes is their density: they condense the whole story in a few words and one can adjust slightly and then have a new story:

The sleeping beauty
A fairy key to the cabinet of horrors
The wolf dressed as grandma
etc.

Tropes are not limited to folktales; they are found behind every perennial story:

The forgotten city
Alien hunts crew
Rags to riches
etc.

Even the short stories circulating in a snap on social media have their own tropes:

Walking in the street at midnight
The lonely traveler
The kitchen nightmare
etc.

Thus, tropes are the ultimate "patterns of communication" that define semiotics. Their compactness property will make them the building blocks of our procedural narratives.

Triggers

Triggers are formulas or objects attached to tropes. The spindle of The Sleeping Beauty is a trigger: if the hero meets "an old woman with a spindle, busily spinning her flax", we anticipate that "scarcely had she touched the spindle when the magic decree was fulfilled". Similar triggers are the "peg" in the door in The Little Red Riding Hood, the bread crumbs of Little Thumb, the fairy key of Blue Beard, or the glass slippers of Cinderella. The same is true for typical formulas, as the poignant petition of Blue Beard's wife: "Anne, sister Anne, dost thou see anybody coming?". To which sister Anne answered: "I see nothing but the sun, which makes a dust, and the grass growing green.", these dialogs are so well known that they immediately trigger the whole trope once heard or read.

Narrative Closures and Tropes

NC and tropes are of different nature. NC are functional closures: they do not deal with the pragmatics of their instantiation in context. They only state that e.g. "prohibition" is a NF and that it calls for "violation". Conversely, Tropes are all about the pragmatics of characters, settings, triggering objects and dialogs. But that doesn't mean that tropes are unbound to the underlying NC(s): Tropes flesh out the NC skeleton. The "sleeping beauty" for instance, is clearly a commonplace of the folktale's lore. The beauty is a princess in all original versions (Batiste, Perrault, Grimm), but it could be taken as a generic "beauty": somebody judged beautiful. This beauty is sleeping, and that raises immediately two questions: Why is the beauty sleeping? and what will make the sleep to stop? Now we have clearly a "curse" closure, a spell has been cast, hence the sleep, and the spell shall somehow be lifted, or we would not have a story in the first place. We have a lot of leeway to stage the origin of the spell, and its removal. The trope of the old grouchy fairy, uninvited to the party and very much pissed, is one choice, but Basile chose another prequel. One way or the other, the "sleeping beauty" is cursed. Once cast, the spell shall execute, and once executed, it shall be lifted.

Tropes Ontology Example

The ontology defines the tropes and their pre-requisites. For example, FIG. 15 shows an example of the "decoy killer" trope (used by Blue Beard), requires an extremely adverse agent.

Play to Narrative

Not all actions get the NF status. Most of the actions found in the story are mere descriptions, letting us enjoy the scenery or the marvels visible on the scene settings:

"Her neighbours and good friends did not stay to be sent for by the new married lady, so great was their impatience to see all the rich furniture of her house, not daring to come while her husband was there, because of his blue beard which frightened them. They ran through" all the rooms, closets, and wardrobes, which were all so rich and fine, that they seemed to surpass one another. After that, they went up into the two great rooms, where were the best and richest furniture; they could not sufficiently admire the number and beauty of the tapestry, beds, couches, cabinets, stands, tables, and looking-glasses in which you might see yourself head to foot; some of them were framed with glass, others with silver, plain and gilded, the finest and most magnificent which were ever seen. They ceased not to extol and envy the happiness of their friend" (Bluebeard).

That last sentence shifts back to the functional backbone of the story: the transgression motif:

"They ceased not to extol and envy the happiness of their friend, who in the meantime no way diverted herself in looking upon all these rich things, because of the impatience she had to go and open the closet of the groundfloor."

A similar example would be special events like the "coming out ball", which leads to the first encounter of the princess.

Transitions

Another type of action is the transition: an action that is not part of a key motif, but that will seam together the functions.

"she was so much pressed by her curiosity, that, without considering that it was very uncivil to leave her company, she went down a little back-stair-case, and with such excessive haste, that she had twice or thrice like to have broken her neck."

Now the wife has left her company, and has reached the forbidden closet, where the critical "violation" NF will take place.

Mere Doings

Finally, we have also fillers, that maintain the practical continuity of doings: rest, wake, eat, move, etc.

Returning to FIG. 10, the ontology 1002 described above may be used to generate the one or more set of rules 1004 (that may be stored by the system) and used by the AI element 806 (implemented using Prolog in one embodiment). As shown in FIG. 10, the particular screenplay may have a plurality of play by play portions generated and each play by play portion may include one or more facts 1006 about the storyline/play. The one or more facts 1006 generate one or more intent belief outcomes 1008 which in turn generate one or more assessments 1010 that are input to the AI element 806. The output of the AI element 806 (described in more detail below) may be input to the SAM element 106C. The output of the SAM 106C which are the modifications of the cast or the actions and fed back to generate a new set of facts 1006 based on the changes made by the user as is now described in more detail.

SAM 106C

The scene adjustment mechanism 106C shown in FIG. 10, may use the AI output along with persona, social map(s) and a playbook to adjust the cast of the screenplay and actions of the screenplay that are fed back to generate the new play/scene based on the new set of facts resulting from the process of the SAM element 106C. From the cast perspective, when the user modifies the cast or the screenplay, the change is huge: in the verbatim mode, the text was directly deciding how the characters were reacting to the evolution of the action: body animations and emotions. Now that the action is redefined interactively, the characters get a life of their own. If the flow of the narrative is nudged in a new direction, they will orient their participation to the new actions (i.e. their goals and scripts) depending on: their assessment of the new situation, their persona and/or their "social map" as shown in FIG. 10. If their persona is directly modified through user interaction, they will also reevaluate their behavior, their social network, and their goals.

SAM: Play to Cast

From the cast perspective, when the user modifies the cast or the screenplay, the change is huge: in the verbatim mode, the text was directly deciding how the characters were reacting to the evolution of the action: body animations and emotions. Now that the action is redefined interactively, the characters get a life of their own. If the flow of the narrative is nudged in a new direction, they will orient their participation to the new actions (i.e. their goals and scripts) depending on: their assessment of the new situation, their persona and/or their "social map" as shown in FIG. 10. If their persona is directly modified through user interaction, they will also reevaluate their behavior, their social network, and their goals. An example of the SAM user interaction is shown in Appendix A for the Bluebeard character.

Character, Actant, Cast

The characters are the participants in the story and, as the story unfolds through a series of scenes that stage a certain action and involve a certain number of characters, such as a king, a godmother, fairies, etc. The characters participate in the story from a specific perspective/role, such as hero, villain, mediator, traitor, etc.

These roles of the characters are called "actants" as defined in Greimas, A. J., 1966, *Semantique Structurale*, Larousse; 1983, *Structural Semantics* (McDowell, D., Schleifer, R., Velie, A. Trans.), University of Nebraska Press. The actants are subordinated to the NC to which they participate, such as 1) Sender and Receiver of the Object in the "Donation" NC; 2) Villain and Victim in the "Villainy" NC, etc.

The characters of the story can be redefined as "actors" or "cast", i.e. performers to whom actantial parts are assigned: Cinderella, a character of the Perrault version, is the cast performing the hero's part. By revisiting the "character" as a "cast", the system allows the cast to be reassigned to a different actantial part: Cinderella might for instance be reassigned to the witch part. The "character" is still "Cinderella", but the actant is now different.

Several formal models are used to achieve the "live cast" effect. The models may include, for example, 1. Facts are assessed using truth tables, polished by common sense rules.
2. Personae are cumulated vectors of semio values resulting from NF (as an Agent, Recipient, or Patient). At any point of the narrative development, the persona is polished by common sense rules.
3. Transient emotions are directly derived from NF (as an Agent, Recipient, or Patient), weighted using persona.
4. Social Maps are computed using common sense rules.
5. Goals and scripts are the result of the narrative context (NF and NC), combined with the cast's persona and social map. They are computed using common sense rules.

Common sense rules are represented in first order logic, using the Prolog II format of Horn Clauses, and are executed using a C# implementation of Prolog II.

Fact Assessment: Intent, Belief and Outcome

Facts are either direct evidence happening in front of the character, or circumstantial evidence reported through a third party, who can be or not involved in the related event. In the direct evidence case, each character can directly interpret the event they are witnessing, depending on their personal history (persona, social map, current goals as shown in FIG. 10). In the circumstantial case, the recipient of the information has to assess the believability of the information and decide how that information needs to be digested. This becomes more complicated when the information reported relates to another character, otherwise involved in a certain relationship with the Agent and the Recipient.

Direct Facts Outcome

When the character witnesses the event, the action outcome is directly interpreted by this recipient depending of the action "semio" value:assertive, adverse, passive or supportive.

Reported Facts Outcome

When the event involving the character is reported through a third party, the fact outcome is interpreted by the recipient as a logical combination of the action "semio" value and the relationship of the agent (reporting the fact) with the recipient as shown in FIGS. 16-18. In FIGS. 16-18, "A" is the agent and "R" is the recipient with the agent communicating a fact to the recipient.

The recipient may then make an assessment of the agent's intent. In the assessment, the agent's intent is inferred by the recipient from the relationship entertained with the agent. Furthermore, the agent's intent is assumed to be positive if the relationship between agent and recipient is positive and the agent's intent is assumed to be negative if the relationship between agent and recipient is negative.

The recipient may then assess the belief of the fact reported. The recipient's belief of the fact reported is correlated to the relationship entertained with the agent. For example, the recipient believes the fact if the relationship between agent and recipient is positive and the recipient does not believe the fact if the relationship between agent and recipient is negative.

The outcome of the fact may be reported, from the recipient's perspective. For example, the outcome of the fact reported, from the recipient's perspective, is a combination (double implication) of the relationship entertained with the agent and the semiotic value of the fact. The outcome is assumed by the recipient to be positive if the fact is positive and the relationship between agent and recipient is positive and the outcome is assumed by the recipient to be positive if the fact is negative and the relationship between agent and recipient is negative. Otherwise, the outcome is assumed by the recipient to be negative.

Indirect Reported Facts Outcome

Figure 19:
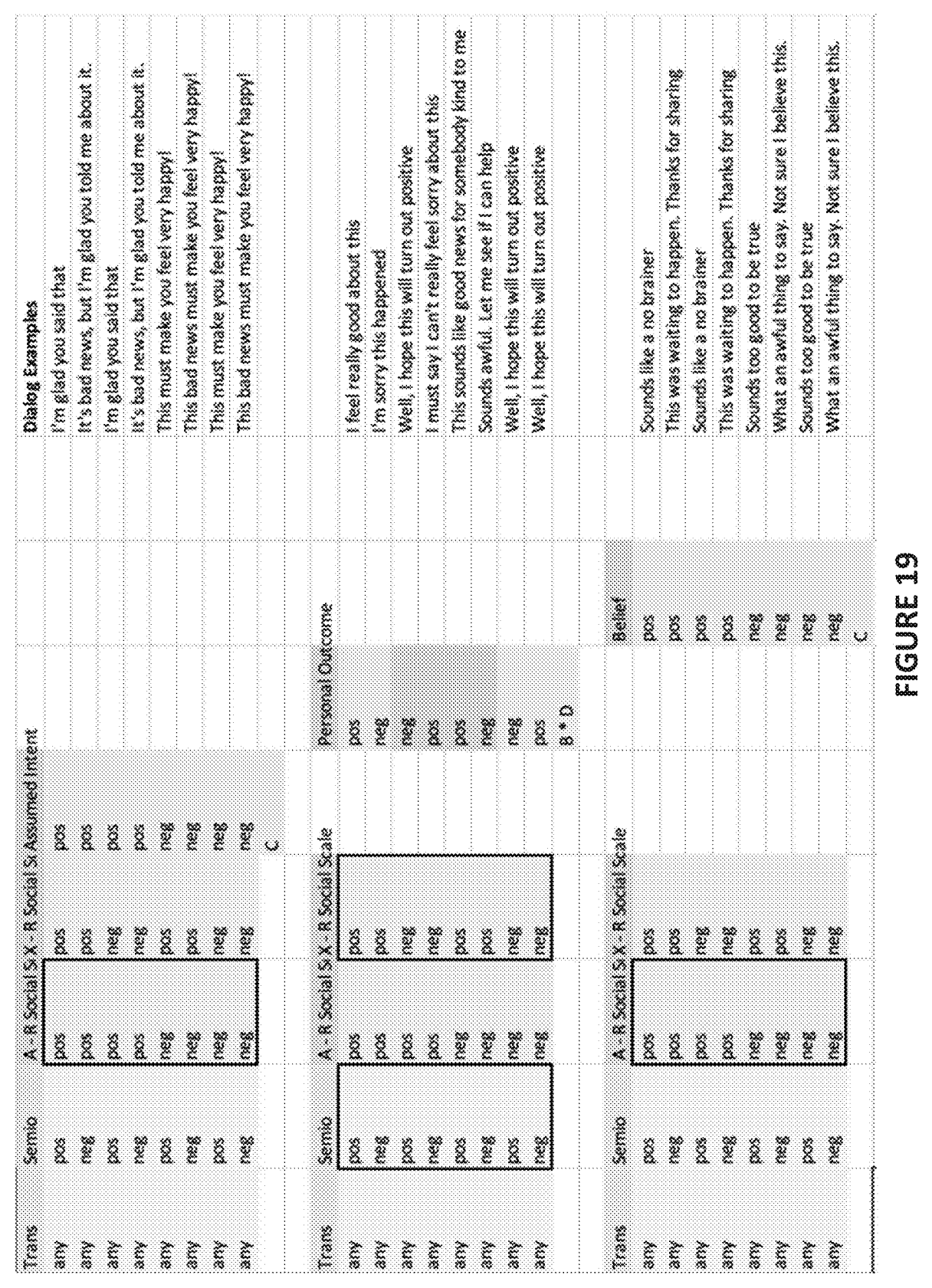

When the reported events involve a third party as the recipient of the action, the fact outcome is interpreted by the recipient as a logical combination of the action "semio" value, and the relationship of the third party with the recipient as shown in FIG. 19 in which "A" is the agent, "R" is the recipient and "X" is a third party and the agent communicates a fact to the recipient about a third party.

As above, the recipient may make an assessment of the agent's intent. For example, the agent's intent is inferred by the recipient from the relationship entertained with the agent so that, for example, the agent's intent is assumed to be positive if the relationship between agent and recipient is positive or the agent's intent is assumed to be negative if the relationship between agent and recipient is negative. The recipient's belief of the fact reported is then assessed and may be correlated to the relationship entertained with the agent in which the recipient believes the fact if the relationship between agent and recipient is positive or the recipient does not believe the fact if the relationship between agent and recipient is negative.

The outcome of the fact reported, from the recipient's perspective may be determined and the outcome is a combination (double implication) of the relationship entertained with the third party and the semiotic value of the fact. For example, the outcome is assumed by the recipient to be positive if the fact is positive and the relationship between the recipient and the third party is positive, the outcome is assumed by the recipient to be positive if the fact is negative and the relationship between the recipient and the third party is negative and/or otherwise, the outcome is assumed by the recipient to be negative.

Intent and Belief

When the event involving the character is reported through a third party, the believability of the reported fact, as interpreted by the recipient, mirrors the relationship of the reporting agent with the recipient. If a dialog is generated, additional nuances are added by the action "semio" value as shown in FIG. 18. When the reported events involve a third party as the recipient of the action, the believability of the reported fact is still interpreted by the recipient as mirroring the relationship of the reporting agent with the recipient. If a dialog is generated, additional nuances are added by the action "semio" value and the relationship of the third party with the recipient (assumed intent of agent) as shown in FIG. 19.

Additional Common Sense Rules

Besides the truth tables shown in FIGS. 16-19, additional common sense rules are used to polish the fact assessment, and to provide the characters with a capacity to explain their assessment. The set of common sense rules may be, for example:

% evil rule: enemies are evil-minded
% pardon rule: we forgive our friends
% friends trust rule: what happens with friends stays with friends
% reality fallacy rule: what you see is not what you think it is
% no witness rule: a silent witness is perceived as a negative Note that the characters use the same rules to define their goals (the best course of action to maximize their outcome) and to guess the other characters" intents and expected outcome.

Persona

The character's persona evolves across the story, starting from the initial persona defined in the story colophon. Play after play, the character reacts to the situation where the character is involved, and forges a different persona, according to the semiotic value of the roles assumed in the play. Cinderella for instance is the "hero" of the story and is supposed to have an "assertive" persona suited to heroes, but has indeed a "passive" persona in the first part of the story, since she is the frequent "victim" of her stepsisters" abuse.

The character's persona will also brutally evolve if a transfer of persona occurs, e.g. if an Ogre persona is transferred to The Little Red Riding Hood, or if a transfer of trope occurs, e.g. if The Little Red Riding Hood now performs the part of The Sleeping Beauty In The Woods.

Persona: Assertive, Passive, Adverse, Supportive

Personae are cumulated vectors of semio values resulting from NF (as an Agent, Recipient, or Patient) in each play. Additional values are used for personae patterns when present, such as Supportive (as an Agent) and Passive (as a Recipient) strengths ("bipolar" persona), etc. These vectors are used for comparison and distance measurement in the context of character transfer. Min-max semio values in these vectors, are also used each time a persona value is needed.

For example, the six features (four persona features and two social features) and thirty-two values of the vector may be defined. The persona features may include an activity tally feature that reflects a level of cast activity compared to all cast activity: low, mild, high with an example for the feature being '1,0,0'; a roles tally feature that is a rank of role (agent, patient, recipient) contribution to character activity with an example being '1,0,0'; a transactions tally feature representing a max transaction ('atrans', 'mtrans', 'etrans', 'xtrans', 'ptrans') for each role: agent, patient, recipient (of an object) with an example being '0,0,0,0,0'+'0,0,0,0,1'+'0,0,0,0,1'; and a semio tally feature that represents a rank of semio level of cast (compared to all semio) with the best semio score ('assertive', 'adverse', 'passive', 'supportive'), across the possible transactions ('atrans', 'mtrans', 'etrans', 'xtrans', 'ptrans') with an example being '1,0,0,0'. The social features may include a leadership_tally feature that indicates a distribution of friends and enemies with one of [loner, popular, jerk, outcast] with an example being '1,0,0,0'; and a clout tally feature being a percentage of characters connected to cast (low, mild, high) with an example being '1,0,0'. Therefore, for the exemplary Blue Beard character, the vector may be "1,0,0,"+"1,0,0,"+"0,0, 0,0,0,0,0,0,0,1,0,0,0,0,1,"+"1,0,0,0,"+"1,0,0,0," +"1,0,0".

Persona: Roles as a Protagonist

The character role as an actant is also part of the persona. Each character participating to a NF is taken as a "protagonist" of the story, and the roles played in the NF and in the embedding NC are cumulated in a role vector, e.g. a "victim" role for the plays where the protagonist is found playing a Passive role as a Patient of an Adverse action in the context of a "Villainy" NC.

Social Map—First and Second Degree Maps

The social map of each character may include a first-degree map and/or a second-degree map. The first degree of the "social map" of each character is just another perspective on semio values attached to each interaction involved by the NF (as/with Agent, Recipient, or Patient) in each play. This time the dyadic relationships between the characters involved in the play are taken in account, along with the semio value of the interaction. The second degree is obtained using common sense rules. These rules cover a lot of ground. Some are simply mechanical (propagation of friends and foes), and others require a complex assessment of the context (as it is assessed) and the friends or foes" personae. Most of the set of common sense rules are best reflected by proverbs:

% A friend in need is a friend indeed.
% A friend to all is a friend to none.
% A man is known by his friends.
% As thick as thieves;
% Birds of a feather flock together.
% False friends are worse than open enemies.
% A friend at hand is better than a relative at a distance.
% Keep your friends close but your enemies closer.
% A man who has friends must himself be friendly.
% The rich knows not who is his friend.
% Strangers are just friends waiting to happen.

Example of Propagation Rules

FIG. 20 shows an example of a snippet of pseudocode (written in Prolog in one embodiment) for an exemplary character that uses the propagation rules as part of the SAM process. As shown in FIG. 20, various propagation rules are implemented including determining friends of the character and using social rules (step friend rules: a friend/foe of my friend/foe is a friend/foe) to determine enemies and other friends of the character. These generic propagation rules are complicated by contextual rules and deep rules.

The contextual rules may be common sense rules that tone up or down the effect of generic rules, depending on the context. For example, the contextual rules may be: 1) for a popular character, "a friend to all is a friend to none"; and "a man is known by his friends"; 2) for cohorts of adverse characters, "As thick as thieves" and "birds of a feather flock together"; 3) for deceitful relationships, "false friends are worse than open enemies"; 4) for proximity to friends vs relatives, "A friend at hand is better than a relative at a distance"; 5) for alertness to enemies, "Keep your friends close but your enemies closer"; 6) for social relationships and status, "a friend in need is a friend indeed", "the rich knows not who is his friend" And "strangers are just friends waiting to happen", etc.

The deep rules may include: 1) a potlatch rule in which the recipient of a beneficial transfer is a debtor of the agent; 2) a small world rule in which the behavior of every individual within the group is related to and dependent upon the behavior of all others; 3) a unilateral fallacy rule that if A affects B repeatedly, there is a hidden retroaction from B to A; etc.

Playbook: Goals and Scripts

Goals are dictated by the logic of the active NC: that NC has to come to its closure. Goals are managed in a stack, the "playbook goals", and each goal has a choice of scripts (described in Schank, R., Abelson, R., 1977, *Scripts Plans Goals and Understanding*, Lawrence Erlbaum Associates), the "playbook scripts". Scripts are sequences of mere actions or NF, with a list of pre-requisites.

Additional common sense rules provide the framework to adjust the short term goals. This is where the story becomes reactive and more interesting: As long as the logic of the embedding NC is respected, short term goals will leverage the social maps and personae in play and open the door for unexpected situations.

The short term goals are expressed in first-order logic, in Prolog format. The goals decision proceeds through 3 steps: 1) Rank goal priorities; 2) Assess achievability; and 3) Resolve goals conflict: abandon, substitution, subsumption.

Goals Priorities

The goal priorities may a crisis situation, settling an old score, self-preservation, enjoy the situation and/or chores. Each of these different goal priorities has a set of rules that apply for that goal priority.

Crisis Situation

For the crisis situation, the character either repairs or retaliates to the crisis situation. The set of rules of the crisis situation may be:

% retaliation rule: if a character's state becomes negative as a result of another character's actions, then the recipient will take steps to retribute that character.

% grudge rule: a grudge remains, even after retaliation, if the offense is unrepaired.

% karma rule: what goes around comes around.

% friend beef rule: the beefs of my friends are my beefs. One generally doesn't care about the beefs of one's enemies.

Settle Old Scores

For the settle old scores, the character is trying to improve credit or attack. The set of rules for the settle old scores goal priority may be:

% better than yours rule: what the other character got is better than what you got; and/or % win at all costs rule: the end justifies the means Self-Preservation The character is trying to build assets in the self-preservation goal priority and an example of the set of rules may be:

% face rule: always try to save face

% credit damage rule: if any character's state becomes negative, then that character will take actions to improve his/her negative state % credit repair rule: if a character is discredited by his/her bad deeds, he/she will make amend to regain credit % bluff amend rule: false amend (deceiver version)

% hijack credit rule: take credit for any action that is not already claimed for % use debtor rule: use debtors as helpers to achieve goals (the offer they can't refuse)

Enjoy the Situation

For the enjoy the situation goal priority, the character enjoys the situation by positive or adverse achievements and the exemplary set of rules may be:

% adverse goals: elimination, sabotage, avoidance, persuasion

% supportive goals: facilitation, mutual convergence, concord, alliance, resource pooling, joint.

Chores

The chores may be, for example, housekeeping, etc.

Achievability

The set of rules for goal achievability may include:

% risk assessment: attack with force while in a weak position is ill-advised

% worse has yet to come rule: consider the most severe possible outcome (pessimistic version); and % hope rule: hope for the best (optimistic version)

Goals Conflict

The goal conflict set of rules may include:

% best choice rules: when given choices, always maximize the best outcome

% happiness rule: always favor the general pursuit of happiness

% preservation rule: stay alive

% wait and see rule: there is no decidable course of action

% no-win rule: no choice leads to a net gain

% zugzwang: any move the character chooses makes him/her worse off than before; and % catch-22: each of the alternative choices in a condition for the other.

Affects and Dialog

"Affects" cover everything that change the emotional state of the characters. In a way similar to events, affects have a duration: an affect can be an on-going affect (a "sentiment"), a lasting affect (an "emotion"), or a short duration affect (a "sensation"). Some examples of these affects are:

Trust, honor, i.e. "ethos" driven sentiments are deep and character-defining. They will generate affects like pride and shame.

Love, anger, i.e. "pathos" driven emotions are strong but transient. They might leave scars, but they have a clear trigger and will eventually dissipate.

Surprise, excitement, are short-term affects.

Trigger

Affects can be triggered by, for example: a fact assessment (such as A deceitful intent, a threatening outcome, will affect the character assessing the fact (intent, belief, expected outcome, see above); or a goal achievement: Rich patterns of affective reactions (e.g. hope, disappointment) result from the underlying playbook performance.

Examples of Goal-Driven Affects

Some examples of goal-driven affects sorted by increasing level of complexity may include:

X is happy if Goal succeeds; affect(X, happiness, pos):−goal(X, Z, succeed). # X is unhappy if Goal fails; affect(X, happiness, neg):−goal(X, Z, fail).

X hopes that Goal will succeed; affect(X, hope, pos):−playbook(X, Goals).

X worried that preservation Goal might fail; affect(X, confidence, neg):−playbook(X, [Z, Goals]), type(Z, preservation).

X's Goal meets expected outcome; affect(X, expectation, pos):−goal(X, Z, Outcome), outcome(Z, Outcome, expected).

X surprised by Goal unexpected outcome; affect(X, expectation, neg):–goal(X, Z, Outcome), not(outcome (Z, Outcome, expected)).
X relieved that Goal did not fail; affect(X, aid, pos):–goal(X, Z, Outcome), outcome(Z, Outcome, expected), \+eqv(Outcome, fail).
X devastated that Goal did not succeed; affect(X, aid, neg):–goal(X, Z, Outcome), outcome(Z, Outcome, expected), \+eqv(Outcome, succeed).
X is grateful to Y if Y helped Goal to achieve; affect(X, gratitude, Y, pos):–support(Y, X, pos), goal(X, G, _).
X resent Y if Y thwarted Goal; affect(X, gratitude, Y, neg):–support(Y, X, neg), goal(X, G, _).

Scale

The system may consider a scale of three levels: Mild, High, and Super Examples of these levels may be: Mild: Wondering, Irritated; High: Bewildered, Frustrated; and Super: Thunderstruck, Outraged.

Tone

The system generated dialogs are driven by the "show, don't tell" golden rule of screenplays. To tell the user that some action just took place is redundant and dull. It is far more interesting to express the characters" affects through dialogs, especially when the effects are the subtle result of a detected deceitful intent, or a failed underlying goal.

Dialogs are the combination of affect and "tone". Tone reflects the character's persona. One given situation, assessed from different character's perspective, generates different affects, depending on these character's assessment and current playbooks, with a scale revealing the impact of the effect on each character. These affects are finally accented using a specific persona tone. For example, a happiness affect may have the following tones in different persona: Assertive persona: Happy tone, Adverse persona: Pessimistic tone, Passive persona: Gloomy tone, and Supportive persona: Cheerful tone. The whole dialog ontology combines all affects with 3 degrees of intensity, and 4 types of persona.

Play by Play

The general logic of the screenplay (re)generation and execution is "play by play": in a "turn-based" fashion, all characters re-assess their situation at each end of play: persona, social map, playbook. When the story is executed verbatim, the characters elaborations stay available to the viewer but do not impact the verbatim unfolding of the story. As soon as the viewer edits the story, using any of the tropes defined above, the verbatim scenario starts to unravel and is replaced, play by play, by a dynamic execution of playbooks, coordinated by SAM.

For example, the general logic of the screenplay (re) generation and execution is "play by play": in a "turn-based" fashion, all characters re-assess their situation at each end of play: persona, social map, playbook. When the story is executed verbatim, the characters elaborations stay available to the viewer but do not impact the verbatim unfolding of the story. As soon as the viewer edits the story, using any of the tropes defined above, the verbatim scenario starts to unravel and is replaced, play by play, by a dynamic execution of playbooks, coordinated by SAM. As an example: when the user changes a character's persona, SAM stores this change on the cast of this specific custom story. This change of persona will change the potential actions that would be considered for the character to follow in the next play. SAM picks one of these actions for the first character and generates a play from it and the reaction from the next character in response. This process feeds back on its own output: each play is generated from the state at the end of the previous one. The user can interrupt this flow at any time by editing the story again, continuing the process in a different direction.

SAM: Live Narrative

A process 2900 followed by SAM to regenerate the scenario after a user interaction is shown in FIG. 21. The process 2900 shown in FIG. 29 may be implemented by the SAM element 106C described above but can also be implemented in other manners that are within the scope of this disclosure. The process 2900 is started at the current play/scene at which the modification/change has occurred (2902). Once the process has been started, the method may provide the cast one good reason for the change, so the cast can justify the change of behavior if asked and these reasons are random picked from a dictionary of all combinations, then integrated in a random dialog template (2904).

Figure 28:
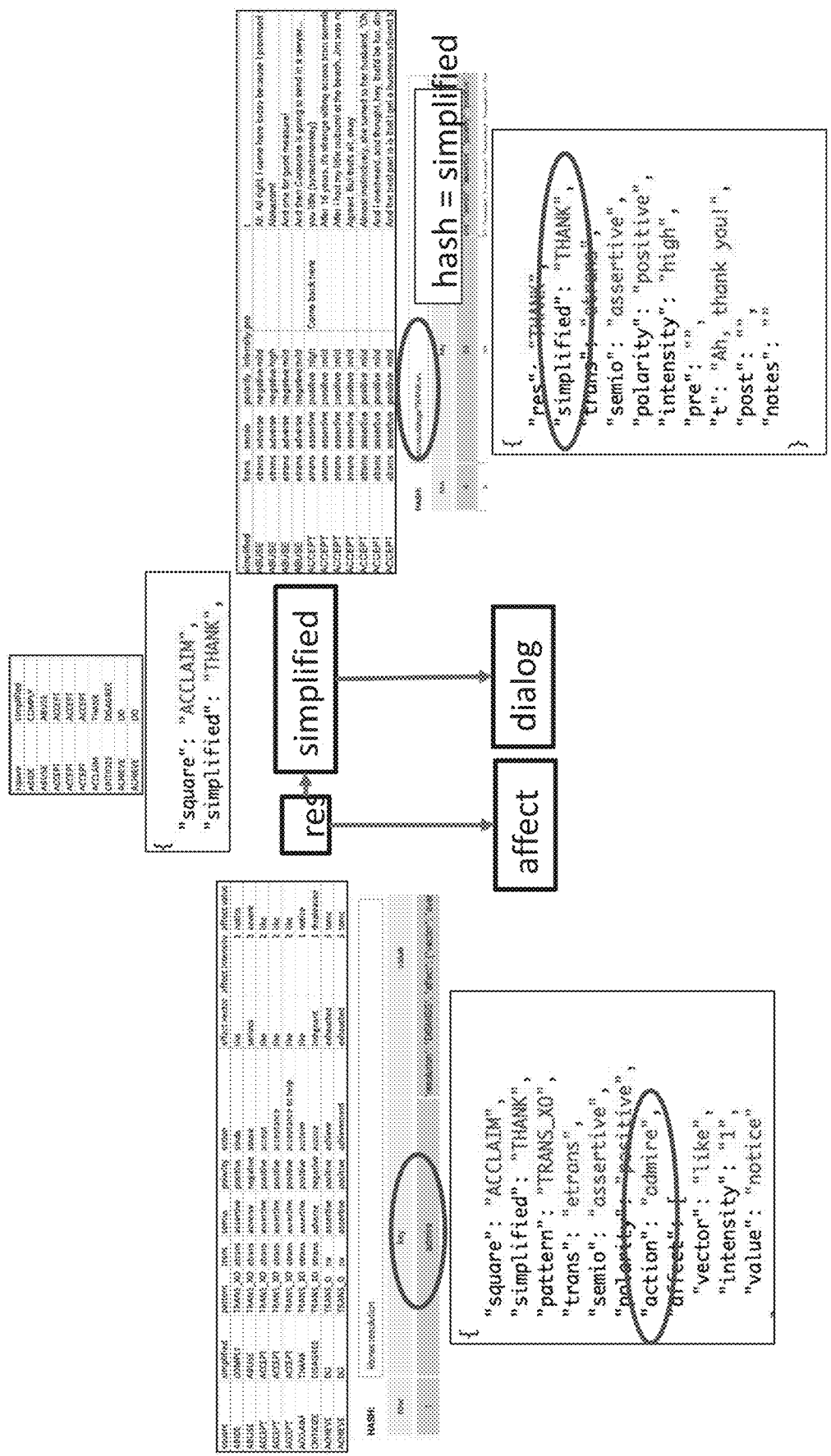
FIG. 28 illustrates an example of the resolution process of a piece of dialog.

The model resolution that occurs at process 2904 shown in FIG. 21 is shown in more detail in FIGS. 26-31 in which FIG. 26 illustrates an example of a resolution model (an ACCLAIM square) and FIG. 27 illustrates an example of a resolution ontology that are used in the resolution process 2904. FIG. 28 illustrates an example of the resolution process of a piece of dialog using the resolution model and resolution ontology in FIGS. 26-27. In the example in FIG. 28, the admire action is resolved using the ACCLAIM square in FIG. 26 into "THANK" dialog.

Figure 29:
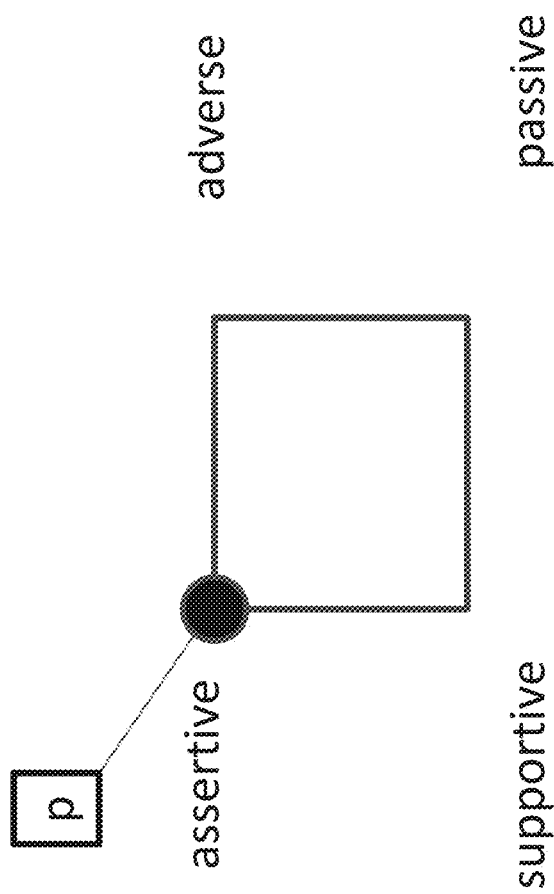
FIG. 29 illustrates an example of a semiotic square of resolutions of the resolution method.
Figure 30:
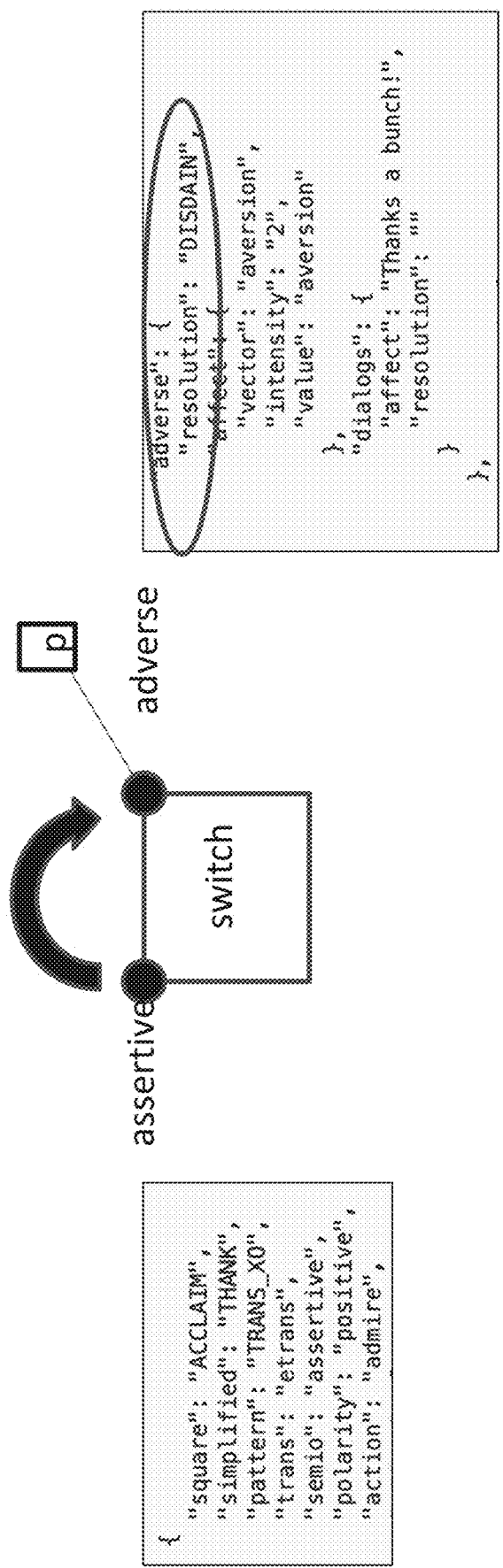
FIG. 30 illustrates an example of a persona switch.
Figure 31:
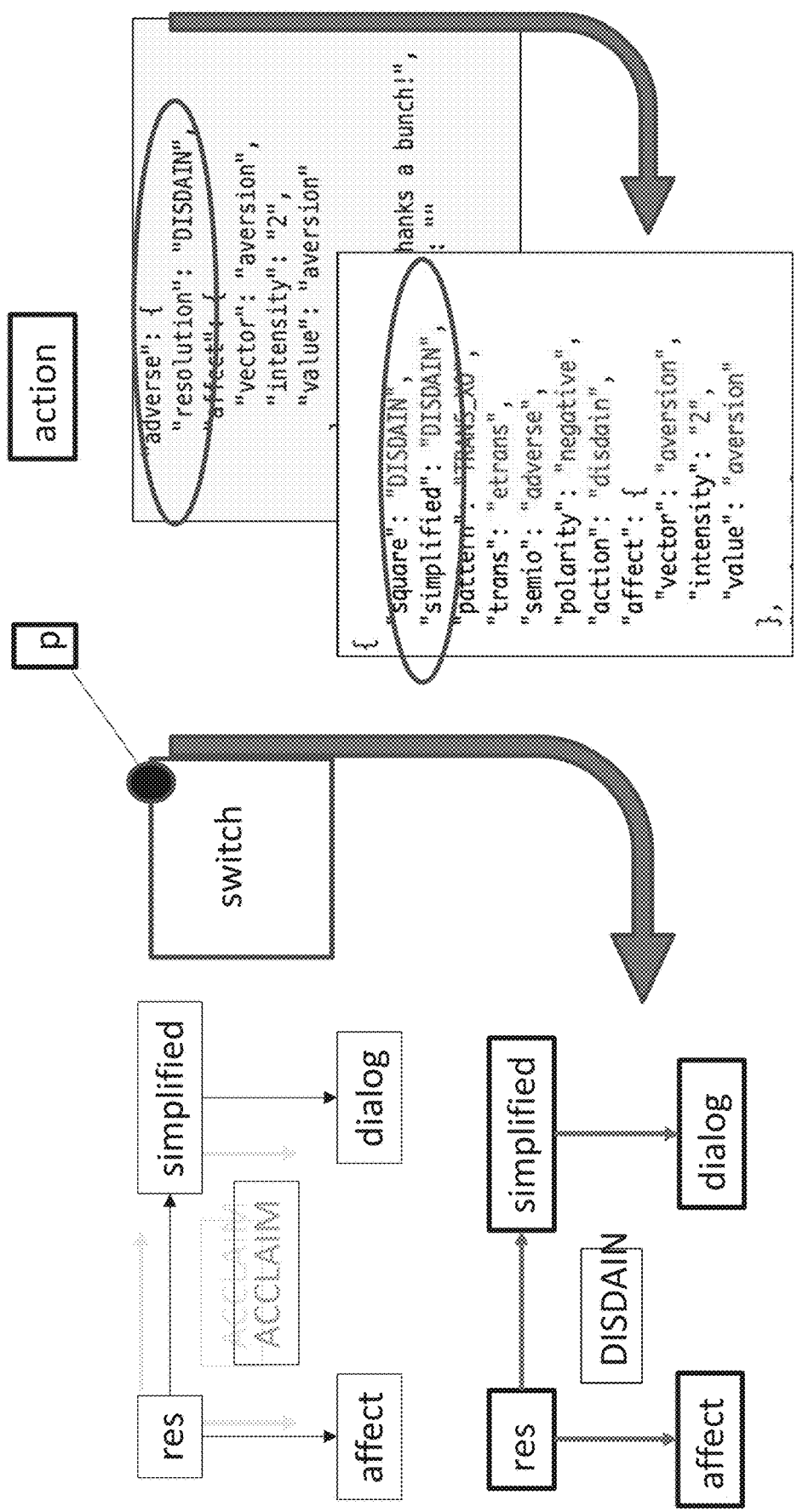
FIG. 31 illustrates an example of a new resolution based on the resolution model.

FIG. 29 illustrates an example of a semiotic square of resolutions of the resolution method in which a persona ("P") is resolved using the semiotic square including an assertive, an adverse, a supportive and a passive personality. FIG. 30 illustrates an example of a persona switch from assertive to adverse based on the resolution process and the differences is scripts for the two personas in which the resolution for the adverse personality is "DISDAIN" as shown. FIG. 31 illustrates an example of a new resolution based on the resolution model in which the semio square changes from ACCLAIM to DISDAIN resulting in the changes the parameter scripts as shown in FIG. 31.

Returning to FIG. 21, the SAM process, starting from the current play, regenerate the screenplay play by play (2906), and at each play, re-evaluate the persona, social map, and playbook of each cast member (2908). The processes 2906-2908 is described in more detail with reference to FIGS. 32A and 32B that is a flowchart of the processes.

Figure 32A:
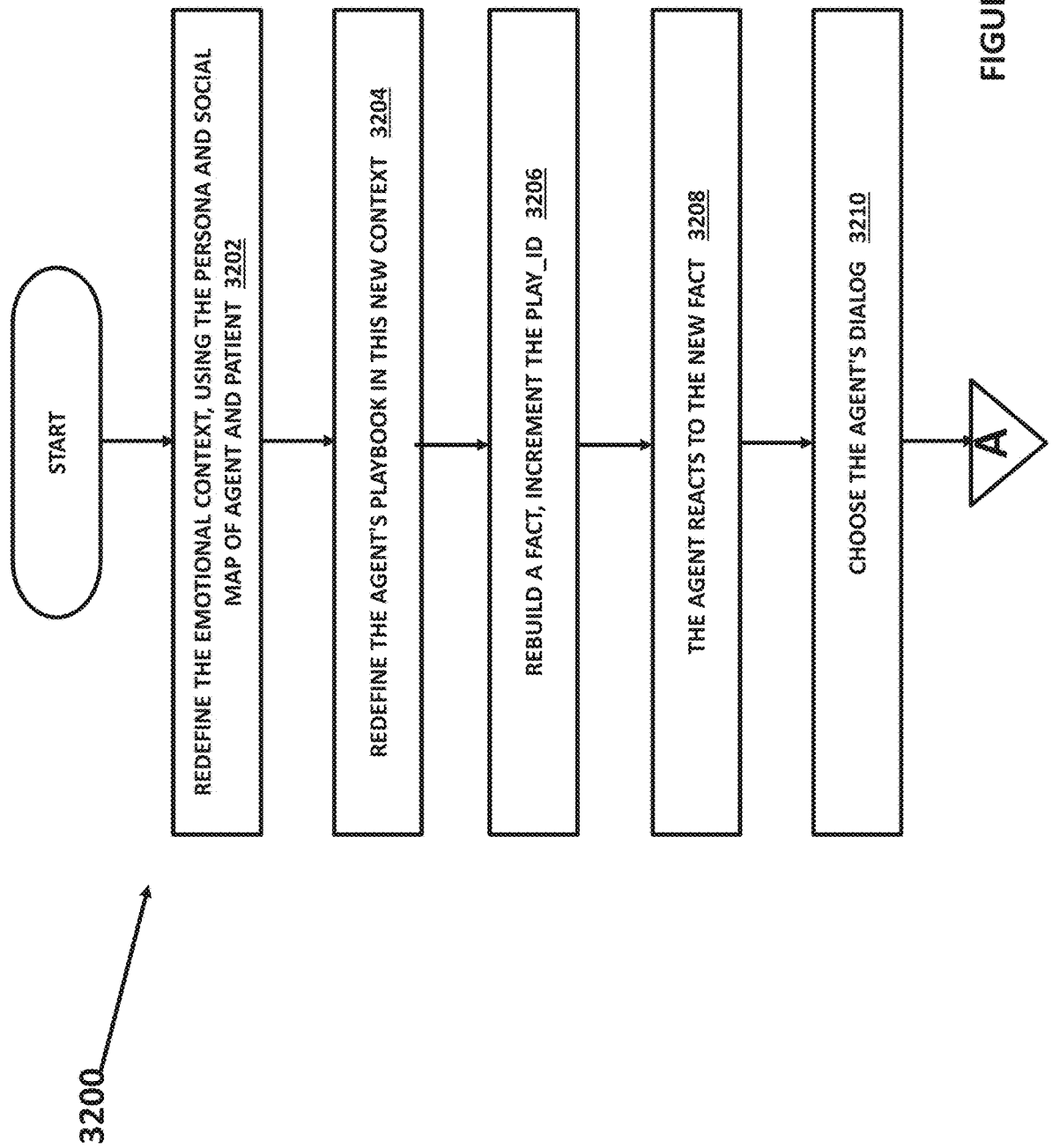
FIGS. 32A and 32B are a flowchart of the play editing process using the scene adjustment mechanism of the system.

FIGS. 32A an 32B illustrate the process from the user alteration of the game state through a manipulation, to the final craft of the new screenplay by SAM 106C. FIG. 33 shows the pseudocode that may implement that editing process. The editing process 3200 may first redefine the emotional context, using the persona and social map of agent and patient (3202) and then redefine the agent's playbook in this new context (3204). This process 3204 may include adjusting any ongoing script or computing a new_script and add the script to the agent's playbook. The method may then rebuild a fact and increment the play_id (3206). This process may include duplicating the previous play, get from the playbook the first action to be executed, find the resolution model of this action, use the resolution model to complete the new fact (action, transaction, semio values) and get the affect from the resolution model as was described above with reference to FIGS. 26-31.

The method 3200 may then determine how the agent reacts to the new fact (3208) that may include finding the resolution model of the fact action, using the affect attached to this resolution model and updating the cast properties for this agent as shown in FIGS. 26-31 described above. The method may then choose the agent's dialog (3210) and may use the simplified resolution to randomize the dialog.

Figure 32B:
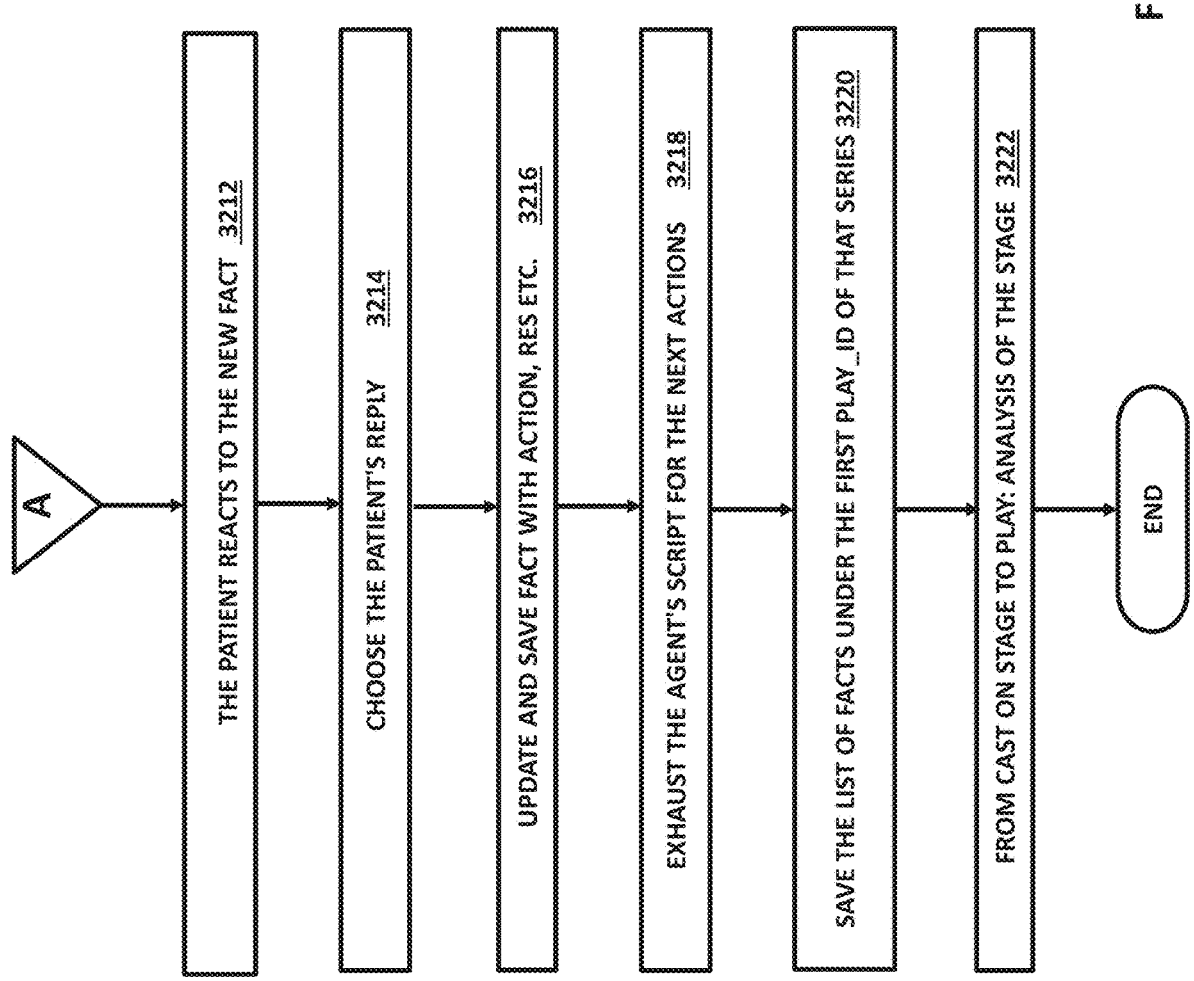

As further shown in FIG. 32B, the method may then determine how the patient reacts to the new fact (3212) that may including finding the resolution model of the fact action, using the emotional context to get the patient's resolution and/or using the resolution model to complete the patient's action, affect. Then method may then choose the patient's reply (3214) in which, given the patient's affect, reply to the agent's dialog. The method may then update and save fact with action, res etc. (3216). The process may include saving the new_fact, saving the cast properties and/or saving the trace explaining SAM's decisions. The method may then exhaust the agent's script for the next actions (3218) in which each iteration is a new fact to add to a list of facts. The method may then save the list of facts under the first play_id of that series. The method may then, from cast on stage to play: analyze the stage (3222) that may determine who is the lead after each turn? If the patient has a strong reaction, and conceives a powerful script, SAM 106C might decide that it is opportune to swap the roles of agent and patient, for example.

Cast Alternation

If a user decides to change a character's persona, say "assertive" to "adverse", the cast re-evaluates his/her playbook. The social map stays unchanged, until the new behavior likely alters it across the following plays.

If the user decides to change a character's social map, say "unfriend" an ally, the cast re-evaluates his/her: social map, by propagating the new relationship to the whole map; playbook, according to the new map of allies and foes; and the persona stays unchanged, until the new behavior likely alters it across the following plays.

Transfer Process

A transfer involves the import of an object from another story. The object can be a character or a motif. The import of a character can be: A merge into a target: The princess gets ogress tendencies; and/or an insert in the story as a new character.

Imported Character

The imported character starts with his/her own persona, and a new social map. The social map is computed by: 1) using the persona vector of the transferred cast member; 2) using the persona vectors of the cast in the target story; 3) computing the closest target vector (Euclidian distance); 4) the transferred character borrows his/her social map from the closest target's social map; and 5) the new playbook is then computed taking in account the current point of the story in the play, the transferred persona and the new social map.

Cast Merge

The target cast gets his/her new persona from the transferred character but keeps his/her social map. The new playbook is then computed taking in account the current point of the story in the play, the new persona and the current social map. The "merge" process comprises the following processes: 1. Backup the merge so that the system is able to restore later the previous (possibly altered) properties of the character receiving the merge; 2. Replace the mergee's persona and scripts with the merger's properties in which the merger's social map is dependent on their story, and cannot be part of the merge, but the merger's persona and the merger's scripts (scripts, tropes, and quirks) are character-centric and can be imported; 3) In this new context, redefine the mergee's playbook; and 4) continue to follow the editing process for agent and patient, and generate the new screenplay. For example, if the Blue Beard character is merged with an ogre, the Blue Beard scripts may be as shown in FIG. 23. As a result of the merge, Blue Beard cancels his current playbook, and recomputes the "best" script using the ogre's access to scripts and tropes.

A cast transfer may comprise the following processes: 1. Get the latest version of the character to be transferred, in case the character has been modified by the editor in its own story; 2. Get the merger's vector; 3) Collect all the vectors for the receiving cast (the closest character might not be on stage); 4. Match the closest vector in the receiving story; 5. Transfer the social map of the closest match to the merger and this transfer of the social map facilitates a relevant integration of the merger and the merger keeps their persona, and their scripts, tropes or quirks. The whole idea of a transfer is precisely to inject these new elements in the receiving story; 6. Add the new merger on stage; and 7. The method continues to follow the editing process for agent and patient and generate the new screenplay. For example, if an ogre character is transferred into the Blue Beard story, the resultant vectors and social map of the ogre are shown in the example in FIG. 24. As a result of the transfer, the ogre uses their new social map, and their previous persona, stock of scripts and tropes to recomputes their "best" script in this new context: e.g. "eat the wife's brothers".

Motifs Transfer

Although the motifs are always imported as such, and not by pieces, it is sometimes more intuitive to provide the user with the capacity to nudge a character or a situation using one single function. For instance, by offering "eavesdropping" as a way to thicken the plot. Behind the scene, the transfer of this opening NF (Eavesdropping) will add the motif (Inquiry), and the closing NF (Disclosure) to the playbook of the cast involved in that motif.

FIG. 22 illustrates a method 3000 for motif transfers that may be part of the scene adjustment process. This process 3000 may be performed by the SAM 106C described above but may also be performed by other elements which is within the scope of the disclosure. The method may first unify the NF template (Agent, Patient, Recipient, etc.) (3002) with the current play, and polish the roles distribution considering personae, social maps and playbooks. The method may then add the closing NF to the playbook of the cast (3004) involved in this new distribution of roles. The method may then adjust playbooks (3006) to take in account the new NF as a priority. The method may then transition the cast involved to the new location and settings required by the NF (3008). The method may then generate the following plays and generate a new scenario based on the motif transfer (3010).

The transfer of a "motif", i.e. the transfer of the Narrative Closure or the Narrative Function supporting a typical story trope, follows the logic used by SAM to generate a playbook and an example of the results are shown in FIGS. 25A and 25B. The playbook generation process may include: 1. Collect the list of scripts that fit the situation resolution (from agent, or from patient's perspective). For example: if the resolution is "SEDUCE", "MARRY", OR "KILL", the "wife serial killer" script is available; 2. Collect the tropes attached to the character considered, agent or patient; 3. Filter out the scripts and tropes that do not fit the prerequisites for ego or alter: age, marital status, persona, etc; 4. Select the "best" available script, considering spectacular steps, length, density, etc.; and 5. make this best script the current playbook, and execute the first action (which might be itself a script). When a motif is transferred to the receiving story, the motif comes as a script, and the prerequisites of that script will be verified as usual, with the only difference that failed requisites will force an adjustment: missing agent or patient: they will be "summoned", possibly by transfer from another story; wrong settings: the cast will move to the right settings, etc. After these adjustments, the story generation will carry on following the same core logic.

Causal Chain

The causal chain is a question and answer (Q&A) system that allows the user to question the AI logic of resolution of the system (for example scene advancement mechanism 106C shown in FIG. 1). In one implementation, this causal chain method may be implemented in the scene advancement mechanism 106C as a plurality of lines of computer code executed by the backend system 106 computer. The Q&A system is supported by a Causal chain of decisions, that represents the AI "thought process". The Q&A system allows the user to question the AI engine, play by play. The Q&A system allows the user to repeat a question to dig deeper and deeper in the AI Causal chain of decisions. As shown in FIG. 40, the AI engine (part of the SAM 106C above) computes the answers to 3 consecutive "why", all at once.

The Q&A method for the AI logic may be performed using a questioning template, an example of which is shown in FIG. 34. The answer to the questions unify with predicates inside the causal chain of decisions made by each character on stage. In the example in FIG. 34, "BB" is Blackbeard the character and "~w" is a phrase to complete some questions for this Blackbeard character. In the example in FIG. 34, thirteen questioning templates are shown that ask about various causal chain questions about the AI logic. As discussed above, these questioning templates allows the user to see/understand/verify the AI resolution logic and update the AI logic as needed.

FIG. 35 illustrates a simplified causal chain questioning templates that has five questions including questions from the agent's perspective and questions from the patient perspective shown in FIG. 35. Both of the question templates in FIGS. 34-25 may be implemented in a manner similar to the Q&A system discussed above or may be stored in the system storage. In the simplified questioning template example, DSID is a decision scenario identifier (ID). The DSID may have 4 decision scenarios (12 DSIDs) explaining the reason "why" the act of the character/it happened that way. The four decision scenarios may include: 1) obligation: answer, retribution, payback (one additional level available, to explain how the obligation was contracted); 2) success or more scripts to execute: continuation of a grand plan; 3) failure: palliative, plan B; and 4) fallback: transition, feedback, quirk, persona, consolidation.

A simplified version example of the Q&A to verify the AI logic is shown in FIGS. 36A-36D. In the example, each question and each answer are shown and then an example of the causal chain code. The Q&A system is capable of returning varying amounts of information, using variable depth: because, and, so, and so, and then as shown in FIG. 36A. The causal chain may include the causal chain of decisions made by each character on stage.

Simplified Resolutions/Script Clause Process

Figure 41:
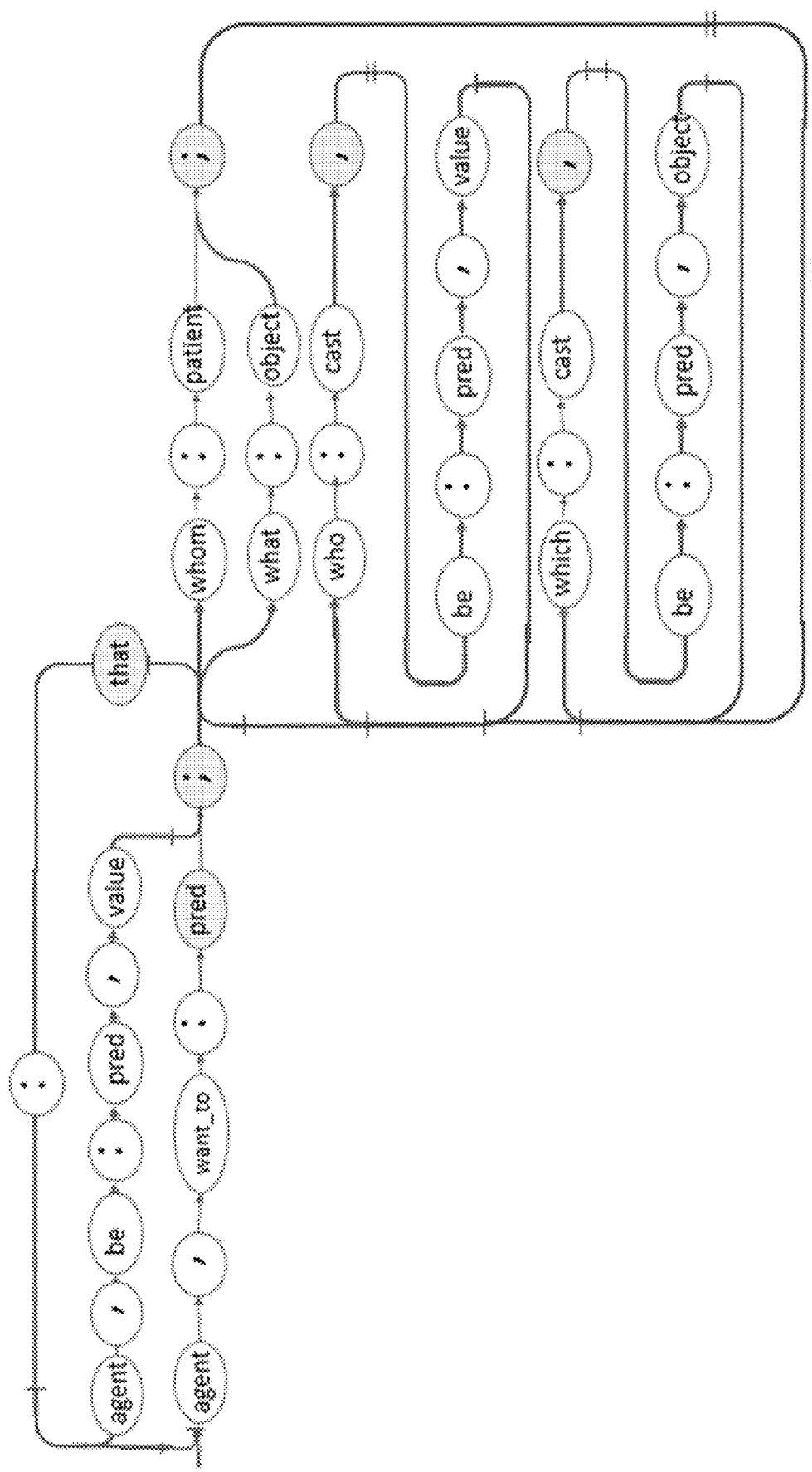
FIG. 41 illustrates an example of a simple resolution model.

The system discussed above may further include a simplified resolution process that may be implemented in the SAM 106C in FIG. 1 or a separate system or element of the system in FIG. 1. The simplified resolution process may be a plurality of lines of computer code/instructions that execute on a processor of the system such as the SAM 106C in FIG. 1, but could be implemented on other processors/computer systems or in a known hardware device like an ASIC or microcontroller. The simplified resolution process includes a simplified English and a mirrored model of simplified logic. These combined models allow the AI engine to complement a simplified sentence initiated by the user and allow the AI engine to "play" a simplified sentence and interpret play-by-play a set of simplified sentences. These combined models allow a user to create a story by creating a set of simplified sentences, exporting the scripts generated play by play by the AI engine, or any combination thereof. Each simplified sentence may be generated by the AI engine of the SAM 106C following a simplified resolution model, an example of which is shown in FIG. 41. For example
"ego,want_to:believe;that:alter,be:kof,fairy" generates "Ego believes that Alter is a fairy" and
"ego,want_to:make_do;whom:somebody;who:somebody, be:kof,fairy;that:somebody,want_to:curse;whom:alter" generates "Ego wants the fairy to curse alter".

FIGS. 37A-C illustrate an example of simplified resolution/script clauses that may be part of the system. The script clause(s) implement the narrative function that is expressed as a logical clause that combines:a core "main" predicate: the narrative function (introduced by "want_to"), and its arguments: agent, patient, object; a list of terms that expresses the optional "embedded" payload and complement the core predicate. An example clause may be: sc_clause(521,[main([n_clauses(2),agent(ego),predicate(active,dislike),nf(dislike)]),embedded([[conj(whom),type (objanim),patient(alter)]])]).

As shown in FIG. 37A-C, the syntax of the script clause follows a "simplified" English syntax so that it is easy to switch from one to the other. These figures also show exemplary code for the script and resolution. The system may also have a simplified English to script interface feature that allows the user to select the sentence constituents as the user progresses through the building of the sentence. The selection is translated into a clause that relies on the ontology to suggest good logical terms to the user, making the process user-friendly and fast. Since the sentence is immediately interpreted as a logical clause, it is possible for the user to "play" the sentence and benefit from the other devices offered by the platform: e.g., interactive nimbus and Q&A. Conversely, if the user lets the AI develop and unfold the story, the user can translate the play-by-play scripts into a sequence of sentences. For example, the sentences may be
   ego,want_to:flee
   ego,want_to:instruct;whom:alter Contract Resolution Model Process The system may include a contract resolution process that uses contracts. A contract is an agreement to engage into a reciprocal exchange of transactions. A contract has an opening and a variety of possible closing transactions depending on the success of the agreement and the respect of its terms. If settled, a contract entails "obligations" for both parties. The above contract resolution process, may be implemented in the SAM 106C in FIG. 1 or a separate system or element of the system in FIG. 1. The contract resolution process may be a plurality of lines of computer code/instructions that execute on a processor of the system such as the SAM 106C in FIG. 1, but could be implemented on other processors/ computer systems or in a known hardware device like an ASIC or microcontroller. The contract resolution process implements a semiotic "contract" model that allows the story to grow consistently from play to play in which the contract binds the protagonists of the play after the parties accept the contract; and "Resolution" and "Obligation" are entailed from a taxonomy of contracts and allow the AI engine to extend the storyline after the changes initiated by the user.

FIG. 38 shows the types of contracts that are part of the system. In one example, there may be fourteen different types of contracts in the system that are shown in FIG. 38. The obligations for each contract (unlike resolutions that have a one-turn decay) are long term dependencies (5 turns decay). In more detail, resolutions are short-lived impulses to react to a specific situation that have a one-turn (in the game) decay which means that they become obsolete after 1 turn. Obligations are lasting contracts entailed by a specific situation and obligations have a five-turns decay which means that they become obsolete after 5 turns.

In the contract resolution process, any promise can be accepted or rejected in which acceptance leads to an obligation of compliance while rejection leads to an obligation of retribution. Some deeds generate payback/retribution. As a general rule, deeds, good and bad, are retributed and good deeds reinforce trust and the quality of the social relationships while evil deeds do the opposite and generate resentment and contempt.

The closing transaction is the "resolution" by the patient of the situation opened by the agent's offer. At each turn of the game, the situation created by the agent is "resolved" depending on various factors, such as: the agent's action; the "believability" of the action; the state of beliefs, trust, and social relationships engaging agent and patient; the emotional context between agent and patient; the narrative laws defining the possible options to resolve the situation; and the persona of the patient. The agent is the character who leads the action, and the patient is the character who undergoes the effects of the action. The patient decides to resolve the situation over the next turn, in a specific way. And the patient might also feel obligated to payback the agent for what they just did. The user is a witness of these decisions, consequences of the user's changes in the situation chemistry: agent's persona, etc.

Each contract may have narrative function opening or closing the contract, a script implementing the narrative function and resolutions (from the patient's perspective) and the first resolution that can be successfully demonstrated triggers the next contract cycle.

The contract resolution process may involve cycles of resolution. The initial trigger of the promise is the acquisition of something that the agent wants, such as wealth, family and/or power. Additional variables may complicate this basic cycle, such as deceit shall be exposed, which leads to retribution or compliance might be transgressed, which leads to retribution. "Reparation" marks the end of the cycle and is a good spot for story termination.

FIG. 39 shows an example of a cycle of resolution in the system. In the example, the actions during the cycles of resolution are shown.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A system, comprising:
a computer system having a processor and memory and a plurality of lines of instructions executed by the processor of the computer system that configure the to computer system to:
receive a piece of text;
generate a screenplay from the piece of text, the screenplay including a cast having a plurality of cast members;
interpret the screenplay to generate a game play having a plurality of game play elements from the screenplay, the game play capable of being played by a plurality of users;
receive, from a particular user, during the game play by a particular user, by the computer system, a modification of at least one aspect of the game play;
rebuild, using an artificial intelligence (AI) engine executed by the computer system, the game play with a narrative of the game play for the particular user and a changed persona for each cast member during the rebuilt game play based on the modification of the at least one aspect of the game play; and provide a rebuilt game play for the particular user in which the persona of each cast member is changed in the rebuilt game play due to the modification of at least one aspect of the game play by the particular user.

2. The system of claim 1, wherein the at least one aspect of the play is one of the cast and the screenplay.

3. The system of claim 2, wherein the computer system is further configured to execute a set of rules using the AI engine that rebuild the play with the coherent narrative.

4. The system of claim 3, wherein the set of rules further comprises a set of semiotic resolution rules, a set of narrative function rules, a set of narrative closure rules, a set of motifs and a set of tropes.

5. The system of claim 4, wherein each trope further comprises a trigger.

6. The system of claim 3, wherein the computer system is further configured to execute, using the AI engine, a set of propagation rules that propagate the modification through the game play elements.

7. The system of claim 1 further comprising a game portion executed by the computer system that executes the plurality of game play elements.

8. The system of claim 1, wherein the game play elements further comprises a floorplan and one or more stickers.

9. The system of claim 8, wherein the game play elements further comprises an animation and a background.

10. The system of claim 9, wherein the one or more stickers further comprises an emotion, a dialog and a voice over.

11. The system of claim 1, wherein the piece of text is one of a book, a fairytale and an article.

12. The system of claim 1, wherein the computer system is further configured to question a logic of resolutions of the AI engine.

13. The system of claim 1, wherein the computer system is further configured to create, using the AI engine, a story using one or more simplified sentences.

14. The system of claim 13, wherein the computer system is further configured to grow the story using a semiotic contract model.

15. The system of claim 1, wherein the computer system is further configured to bind one or more protagonists of a story.

16. A method, comprising:
receiving, at a computer system, a piece of text;
generating, by the computer system, a screenplay from the piece of text, the screenplay including a cast having a plurality of cast members;
interpreting, by the computer system, the screenplay to generate a game play having a plurality of game play elements from the screenplay, the game play capable of being played by a plurality of users;
receiving, from a particular user, during the game play by a particular user, by the computer system, a modification of at least one aspect of the game play;
rebuilding, using an artificial intelligence (AI) engine executed by the computer system, the game play with a narrative of the game play for the particular user and a changed persona for each cast member in the rebuilt game play based on the modification of the at least one aspect of the game play; and
providing a rebuilt game play for the particular user in which the persona of each cast member is changed in the rebuilt game play due to the modification of at least one aspect of the play by the particular user.

17. The method of claim 16, wherein the at least one aspect of the play is one of a cast and the screenplay.

18. The method of claim 17, wherein rebuilding the play further comprises executing a set of rules using the AI engine that rebuild the play.

19. The method of claim 18, wherein the set of rules further comprises a set of semiotic resolution rules, a set of narrative function rules, a set of narrative closure rules, a set of motifs and a set of tropes.

20. The method of claim 19, wherein each trope further comprises a trigger.

21. The method of claim 18, wherein rebuilding the play further comprises executing, using the AI engine, a set of propagation rules that propagate the modification through the game play elements.

22. The method of claim 16 further comprising executing the game using the rebuilt play.

23. The method of claim 16, wherein the game play elements further comprises a floorplan and one or more stickers.

24. The method of claim 23, wherein the game play elements further comprises an animation and a background.

25. The method of claim 24, wherein the one or more stickers further comprises an emotion, a dialog and a voice over.

26. The method of claim 16, wherein the piece of text is one of a book, a fairytale and an article.

27. The method of claim 16 further comprising questioning a logic of resolutions of the AI engine.

28. The method of claim 16 further comprising creating, using the AI engine, a story using one or more simplified sentences.

29. The method of claim 16, wherein the computer system is further configured to grow the story using a semiotic contract model.

30. The method of claim 29, wherein the computer system is further configured to bind one or more protagonists of a story.

* * * * *